US007841272B2

(12) United States Patent
Actis et al.

(10) Patent No.: US 7,841,272 B2
(45) Date of Patent: *Nov. 30, 2010

(54) STRAP WELDING SYSTEM AND METHOD

(75) Inventors: Bradley Paul Actis, Tollhouse, CA (US); Howard W. Jaenson, Covina, CA (US)

(73) Assignee: H.W.J. Designs for Agribusiness, Clovis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/435,275

(22) Filed: May 4, 2009

(65) Prior Publication Data

US 2009/0211465 A1 Aug. 27, 2009

Related U.S. Application Data

(63) Continuation of application No. 11/712,781, filed on Feb. 28, 2007, now Pat. No. 7,526,995.

(51) Int. Cl.
B65B 13/20 (2006.01)
B65B 13/24 (2006.01)

(52) U.S. Cl. ............... 100/2; 100/3; 100/8; 100/11; 100/26

(58) Field of Classification Search .......... 100/2, 100/3, 7, 8, 11, 25, 26, 29, 33 R
See application file for complete search history.

(56) References Cited

U.S. PATENT DOCUMENTS

| | | | |
|---|---|---|---|
| 3,475,879 A * | 11/1969 | Merkel et al. ........... 53/529 |
| 3,720,158 A | 3/1973 | Sauer et al. | |
| 4,356,784 A | 11/1982 | Waters et al. | |
| 4,391,186 A | 7/1983 | Davis | |
| 4,805,528 A | 2/1989 | Rogers et al. | |
| 5,584,636 A | 12/1996 | Ramsey | |
| 5,644,978 A | 7/1997 | Jaenson et al. | |
| 5,921,174 A | 7/1999 | Anthony | |
| 6,487,833 B1 | 12/2002 | Jaenson et al. | |
| 6,536,336 B1 | 3/2003 | Jaenson et al. | |
| 6,591,743 B2 | 7/2003 | Deutsch et al. | |
| 6,701,831 B2 | 3/2004 | Jones et al. | |
| 7,093,535 B2 * | 8/2006 | Daniel et al. ........... 100/26 |
| 7,121,195 B2 * | 10/2006 | Daniel et al. ........... 100/33 R |

(Continued)

OTHER PUBLICATIONS

"P361-6 and P361-3 Fully Automatic Bale Tying Systems Designed for the cotton Industry's Lift Box Balers," Samuel Strapping Systems (2 pages).

(Continued)

*Primary Examiner*—Jimmy T Nguyen
(74) *Attorney, Agent, or Firm*—Klein, O'Neill & Singh, LLP

(57) ABSTRACT

Bale strap assemblies for strapping a pressed bale are discussed herein. The bale strap assemblies may include a strap positioning assembly having a plurality of strap assemblies and a return chute assembly having a plurality of return chutes for returning straps to the strap assemblies for strapping the pressed bale. The strap position assembly and return chute assembly incorporate cylinders to move between different positions during a strapping cycle. Exemplary embodiments include provisions for accommodating a press turntable of a down packer and registration means for providing a greater number of straps to strap a bale than a corresponding number of strap assemblies.

24 Claims, 15 Drawing Sheets

U.S. PATENT DOCUMENTS 7,127,986 B2 * 10/2006 Daniel et al. .................. 100/26
7,395,952 B2 * 7/2008 Daniel et al. ................ 226/185

OTHER PUBLICATIONS

Photos of Applicant's own prior art bale strapping systems (32 photos, 8 pages).

Office Action mailed Jun. 13, 2008 from related U.S. Appl. No. 11/712,781.

Final Office Action mailed Nov. 13, 2008 from related U.S. Appl. No. 11/712,781.

Notice of Allowance mailed Feb. 24, 2009 from related U.S. Appl. No. 11/712,781.

* cited by examiner

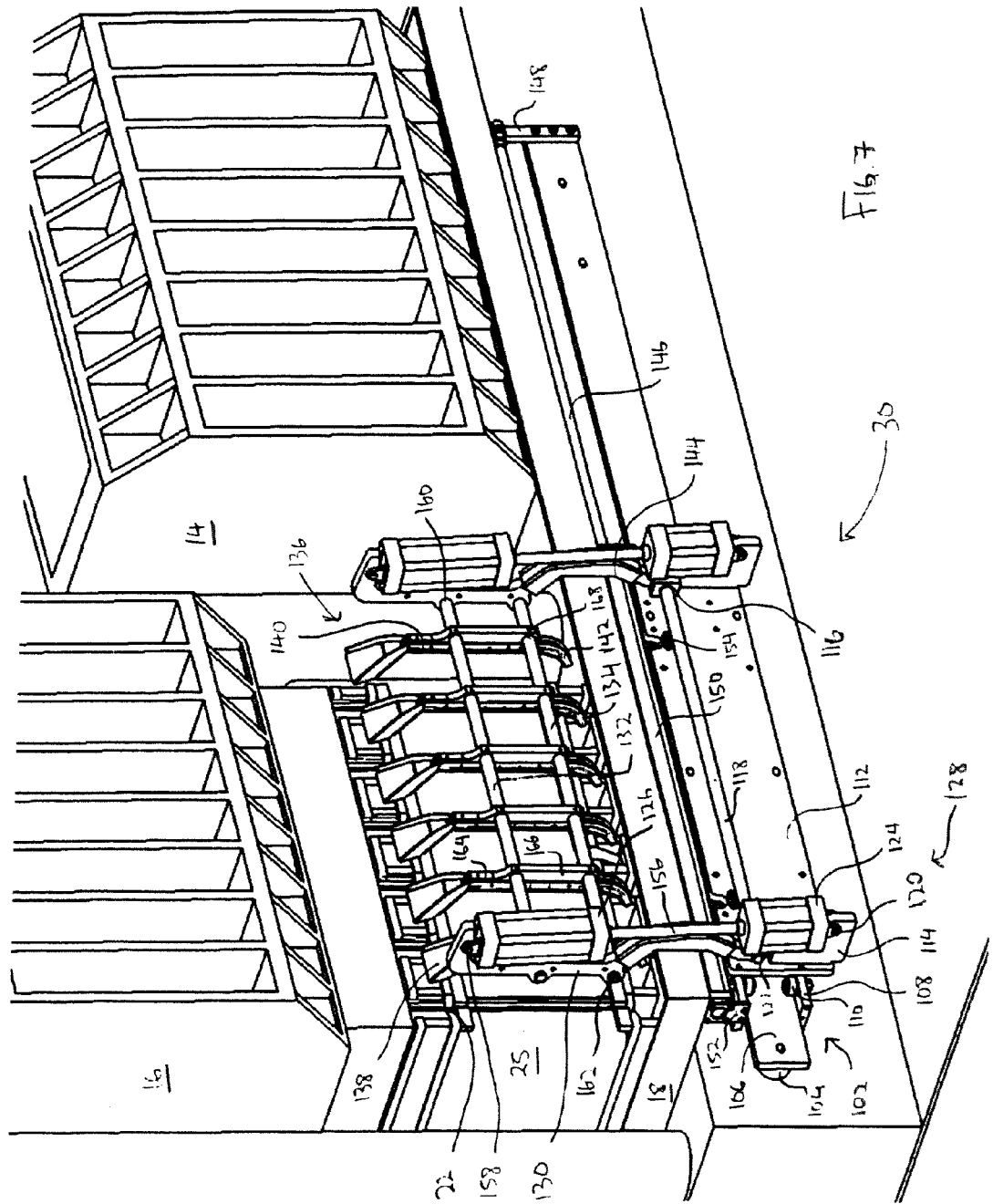

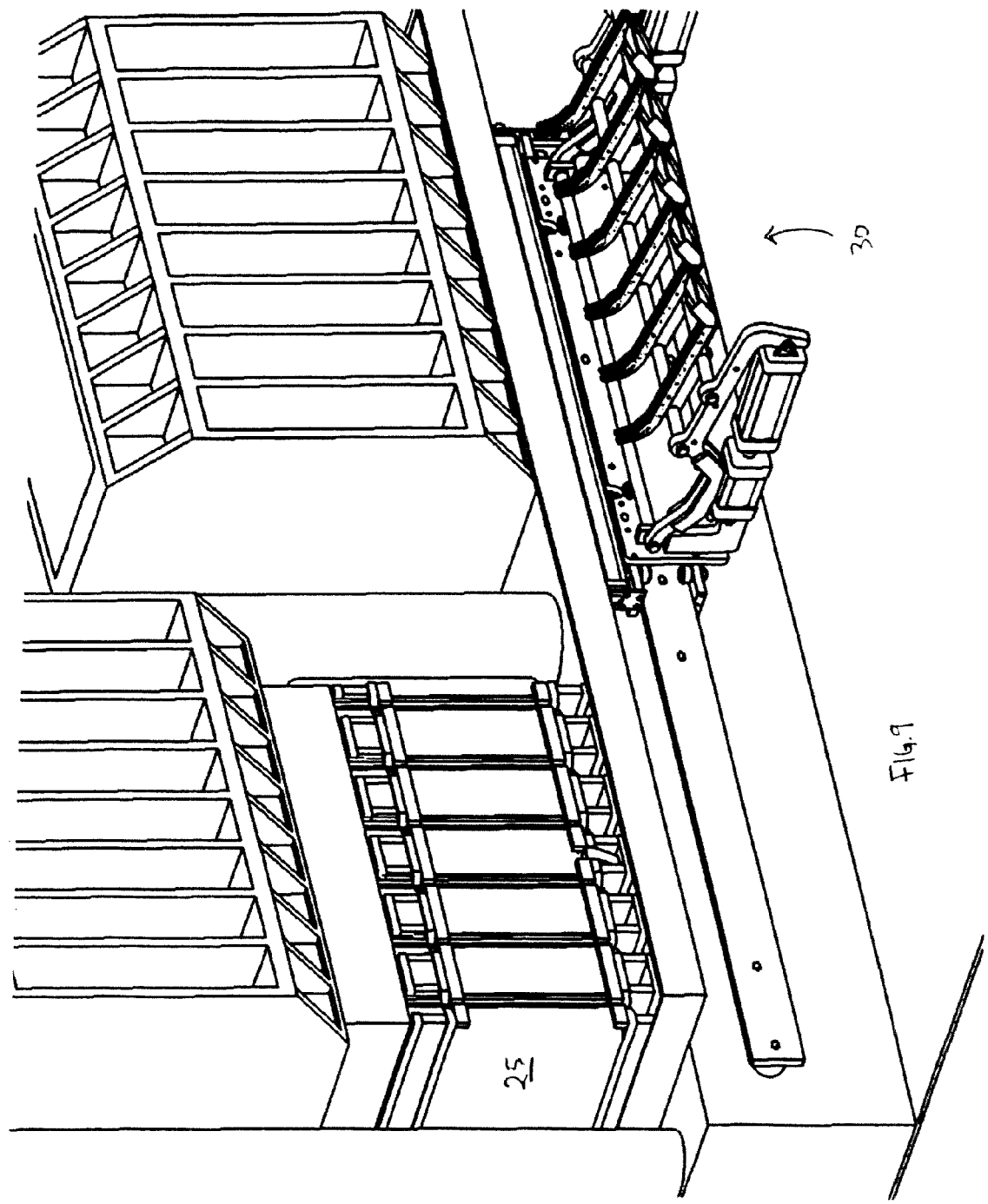

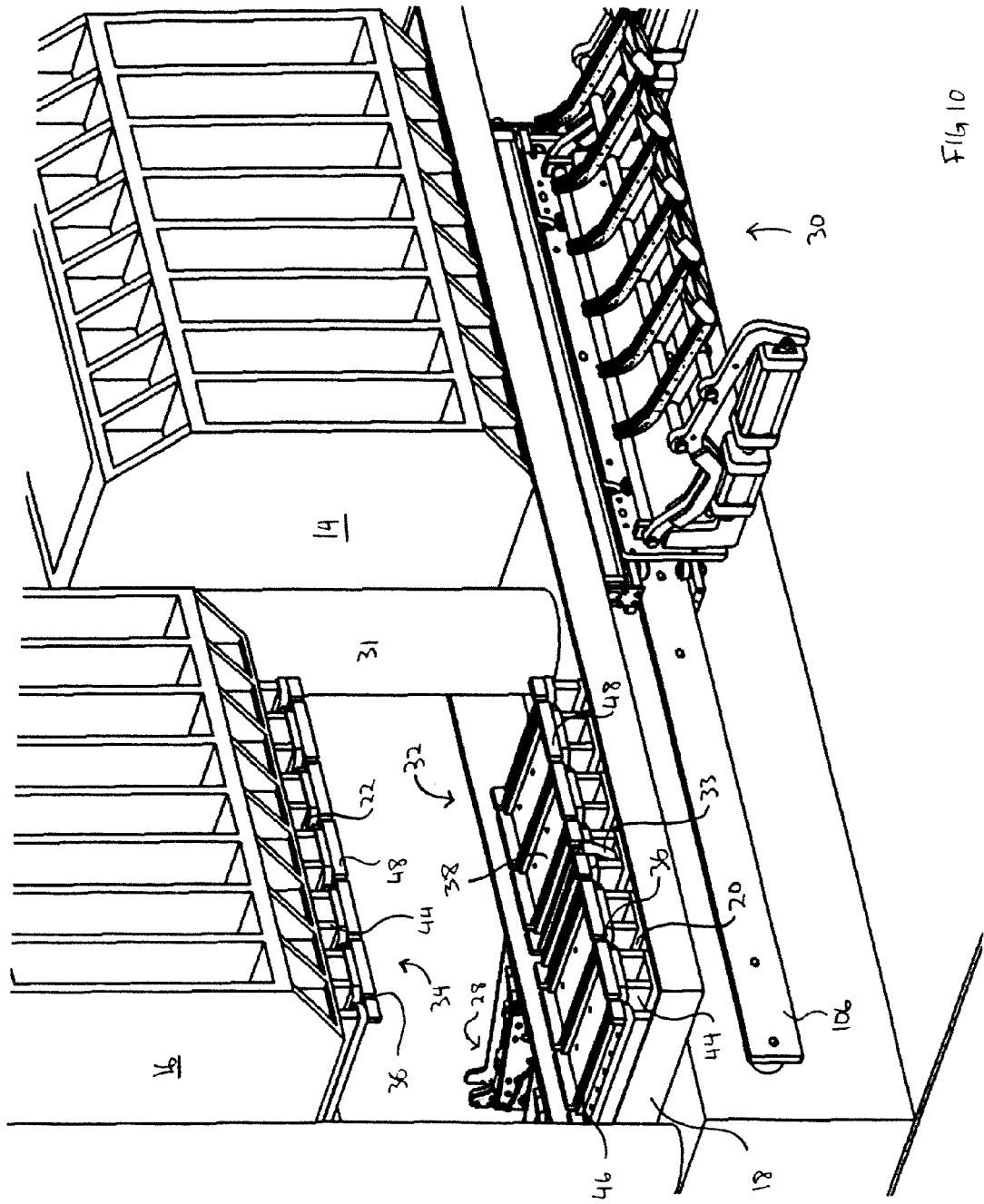

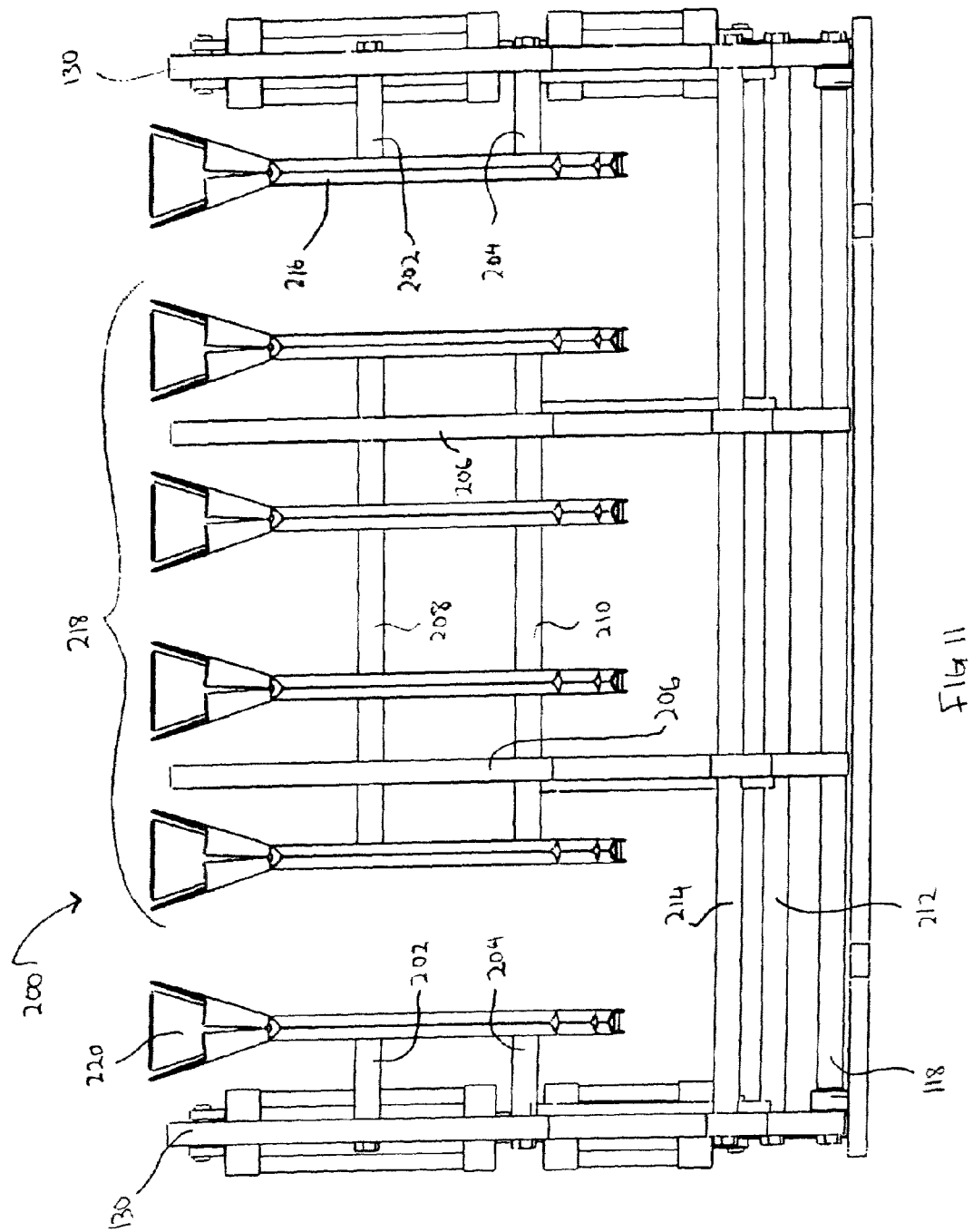

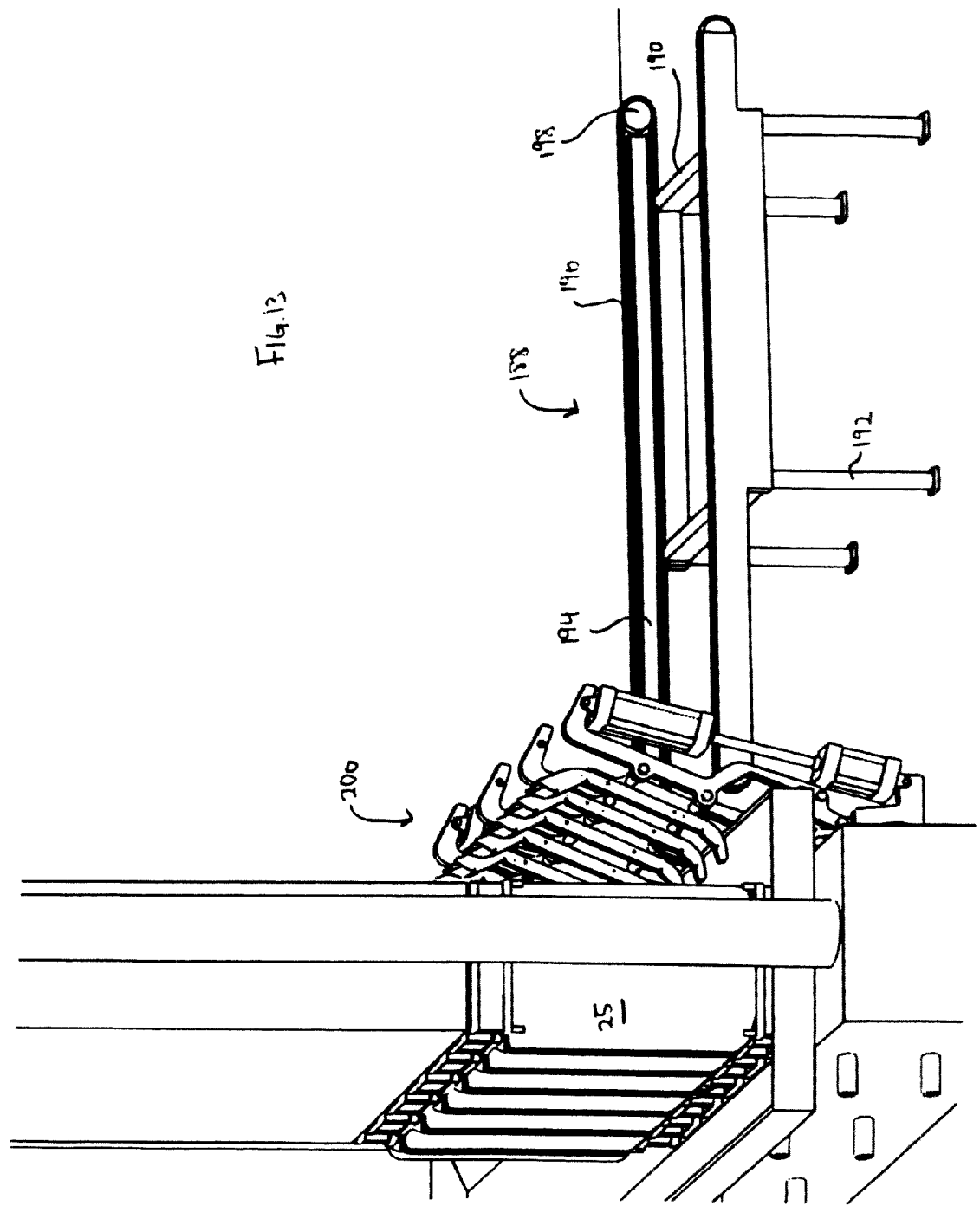

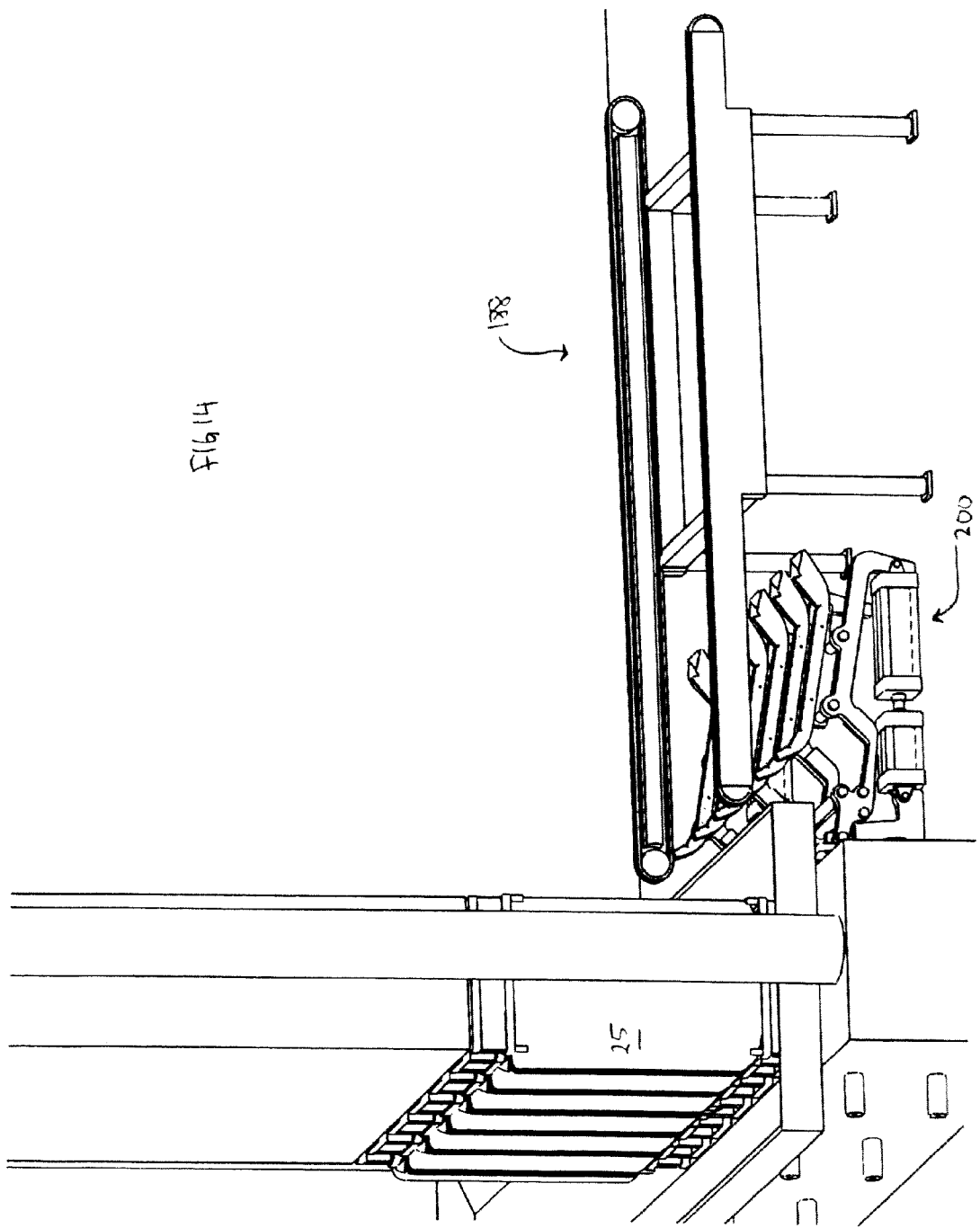

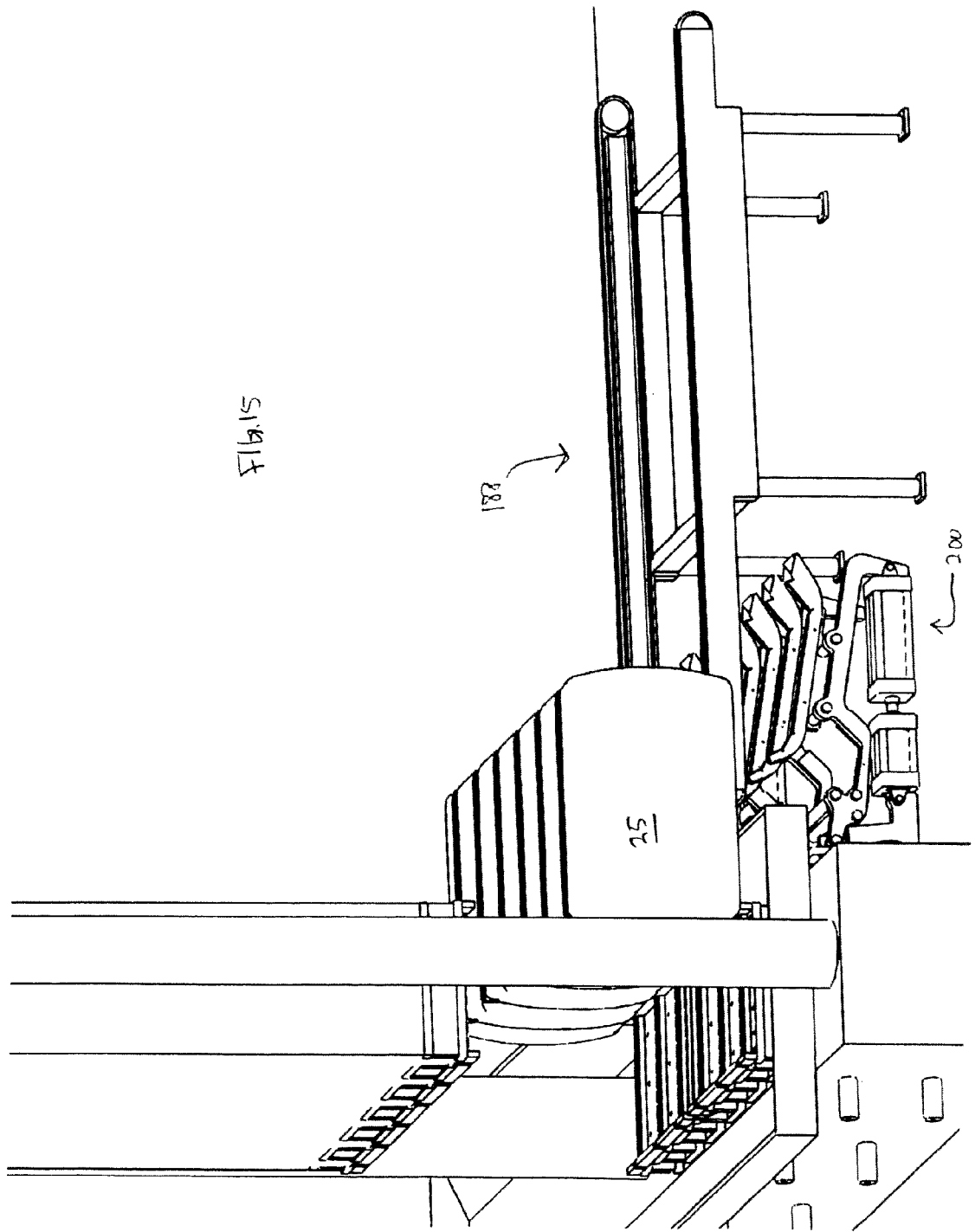

STRAP WELDING SYSTEM AND METHOD

CROSS-REFERENCE TO RELATED APPLICATION

This is a continuation of application Ser. No. 11/712,781, U.S. Pat. No. 7,526,995, filed Feb. 28, 2007, the contents of which are expressly incorporated herein by reference as if set forth in full.

BACKGROUND

In the cotton industry, the process of strapping a bale has been generally transitioned from using humans to manually tie bales to using automated machines to automatically strap bales. In the cotton or fiber industry, there are generally three ways in which to secure a bale after the bale has been pressed. Pertinent securing means include pre-formed steel wires having interlocking ends, flat ribbon-steel bands having their ends inserted into a crimp, and flat thermoplastic strapping material.

Pre-formed steel wires may be tied by pivotally mounted wire bend assemblies which take the place of workers on each side of the baling press, and bend the tie wires around a bale by inserting the ends of the tie wires into a wire tie guide assembly. However, workers are still required to individually load each of a plurality of tie wires into the wire bend assemblies.

Bale tying using flat steel straps is hindered primarily by the cost of the strapping material, the complexity of the machinery used, and the speed at which the machinery is able to operate. In addition, the sheer weight of the steel strap tie material and its substantially sharp edges makes the material cumbersome and dangerous to handle.

Conversely, plastic or other non-ferrous material is ideal for strapping bales of cotton or other fibers. Plastic is relatively lightweight, can be formed into a variety of widths and thicknesses and has relatively soft edges, allowing for easy handling and lower shipping costs. Plastic or other non-ferrous strapping material is competitive with wire ties on a cost per bale basis, and is easily adaptable to fully automatic tying machinery. Additionally, plastic or other non-ferrous strapping material is readily recyclable by the end user and is considered substantially safer than steel strapping material, particularly in instances of strap breakage.

Generally, automatic bale strapping device are categorized as up-packers, wherein baling chambers reside underneath the bale strapping device, often under the floor or ground, and down-packers, wherein baling chambers are located above the bale strapping device.

Down-packer-type presses are generally less expensive to purchase and install as much, if not all, of the work is done above ground. However, a down-packer-type press tends to give up some performance advantages, namely, cycle time or bales-per-hour. The invention herein speeds the strapping portion of the cycle, thereby shortening the overall cycle time and allowing more bales-per-hour to be processed.

SUMMARY

A combination strap assembly and baling press is provided comprising a base plate for pressing pressable materials against, said base plate defining a plane, a strap positioning assembly comprising a plurality of strap assemblies for providing straps around the pressable materials, a return chute assembly comprising a plurality of return chutes for redirecting straps supplied by the plurality of strap assemblies and a structure comprising a moveable arm for moving the plurality of strap assemblies from a position substantially below the plane defined by the base plate to a position above, at least in part, the plane. The combination strap assembly and baling press may include a shock absorber comprising a resilient stop member such as a spring for cushioning the strap positioning assembly as the strap position assembly contacts the bailing press.

In one exemplary embodiment, the combination strap assembly and baling press further comprising a pair of pneumatic cylinders each comprising a push rod for moving the moveable arm, and the two push rods of the pair of pneumatic cylinders may be mechanically coupled to one another. An indexing pneumatic cylinder comprising a push rod may be located on the strap positioning assembly, wherein the push rod of the indexing pneumatic cylinder is orientated to move in a direction generally orthogonal to the two push rods of the pair of pneumatic cylinders. Additionally, an indexing pneumatic cylinder may be in communication with the return chute assembly for traversing the return chute assembly along the track.

The combination strap assembly and baling press may further comprise a bale conveyor assembly for moving a strapped bale from the baling press. The bale conveyor assembly may comprise two spaced apart rails.

In another exemplary embodiment, a combination strap assembly and baling press is provided comprising a base plate rotatably mounted below two baling chambers, said base plate defining a plane, a strap positioning assembly comprising a plurality of strap assemblies for providing straps around a pressed bale, a return chute assembly comprising a plurality of return chutes for redirecting straps supplied by the strap assemblies. The strap positioning assembly and the return chute assembly may be positioned below the plane defined by the base plate so that the base plate may rotate over the strap positioning assembly and the return chute assembly.

The strap positioning assembly may further comprise at least one register tube and at least one positioning rail, wherein the at least one register tube is coaxial with and adapted to slide telescopically with respect to the at least one positioning rail.

Yet another exemplary embodiment of the present invention includes a strap assembly mountable on a baling press having a base plate defining a plane, the strap assembly comprising a strap positioning assembly having a plurality of strap assemblies for providing straps around the pressable materials, a return chute assembly having a plurality of return chutes for redirecting straps supplied by the plurality of strap assemblies, at least two pneumatic cylinders each comprising a push rod in communication with each other for moving the plurality of strap assemblies about a pivot point, and wherein the two push rods are coaxial.

Also provided is a method for strapping compressible material comprising compressing a plurality of compressible materials against a plate, said plate defining a plane, exposing the compressed materials for strapping, raising a plurality of strap assemblies from a position below the plane defined by the plate, providing a plurality of straps around the compressed materials to strap the compressed materials, and lowering the plurality of strap assemblies to the position below the plane defined by the plate.

An exemplary embodiment of the present invention includes a method for strapping compressible material comprising the steps compressing a plurality of compressible materials between a lower plate assembly and an upper plate assembly, said lower plate assembly defining a plane, exposing the compressed materials for strapping, raising a frame comprising a plurality of strap assemblies from a position below the plane defined by the lower plate assembly and contacting the frame against the upper plate assembly, providing a plurality of straps around the compressed materials to strap the compressed material, and lowering the plurality of strap assemblies to the position below the plane defined by the lower plate assembly.

BRIEF DESCRIPTION OF THE DRAWINGS

FIG. 6 is a side view of the load side of the bale strapping assembly of FIG. 1 with the strap positioning assembly in a used position;

FIG. 7 is a perspective view of a receiving side of an exemplary bale strapping assembly of the present invention wherein a return chute assembly is in a used position;

FIG. 10 is a perspective view of the receiving side of the bale strapping assembly of FIG. 8 absent a bale in the baling chamber;

FIG. 11 is a top view of another exemplary embodiment of a return chute assembly adapted for used with a bale conveyor;

FIG. 13 is a perspective view of a receiving side of a bale strapping device including a bale conveyor;

FIG. 14 is a perspective view of the receiving side of the bale strapping device of FIG. 13 with a return chute assembly in a stowed position; and FIG. 15 is a perspective view of the receiving side of the bale strapping device of FIG. 14 with a bale being transported by the bale conveyor.

DETAILED DESCRIPTION

Figure 1:
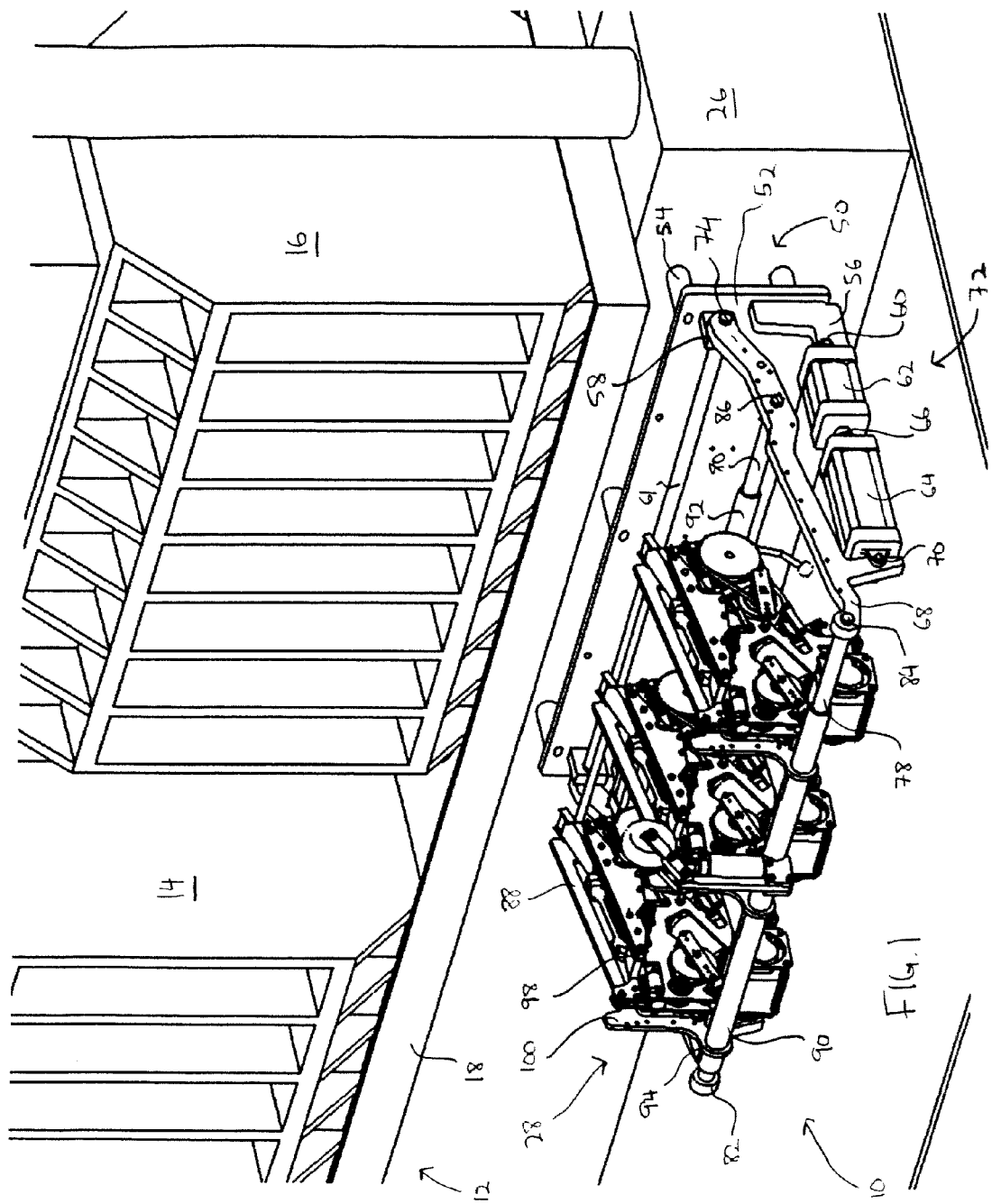
FIG. 1 is a perspective view of an exemplary load side of a bale strapping device of the present invention with a strap positioning assembly in a stowed position.

Referring now to FIG. 1, a perspective view of a load side of an exemplary embodiment of a strap feeding, retracting, and welding device 10 mounted on a down-packer type cotton baling press 12 is shown. As is well known in the art, a typical down-packer type baling press 12 comprises a first baling chamber 14 and a second baling chamber 16 mounted on a turntable base plate 18. The two baling chambers are typically constructed from a steel reinforced frame having a rectangular shape box for forming part of the periphery of a compressed bale. Generally, fiber, such as cotton, cotton lint and/ or synthetic fiber, to be pressed is loaded into the first baling chamber 14. Simultaneously, while the fiber is loaded in the first baling chamber 14, a bale is being pressed in the second baling chamber 16 and is then strapped using a bale strapping device 10 to secure the bale for transportation, as described in more detail below. After the bale located in the second baling chamber 16 has been strapped and transported from the baling press 12, the turntable base plate 18 rotates so that the loaded fiber in the first baling chamber 14 is pressed into a bale and strapped using the bale strapping device 10 while cotton lint or fiber is loaded into the second baling chamber 16. The double baling chamber system provides a more efficient and faster baling process than using a single chamber because the processes of loading the fiber for baling takes close to the same amount of time as pressing it to a bale and strapping it.

Figure 3:
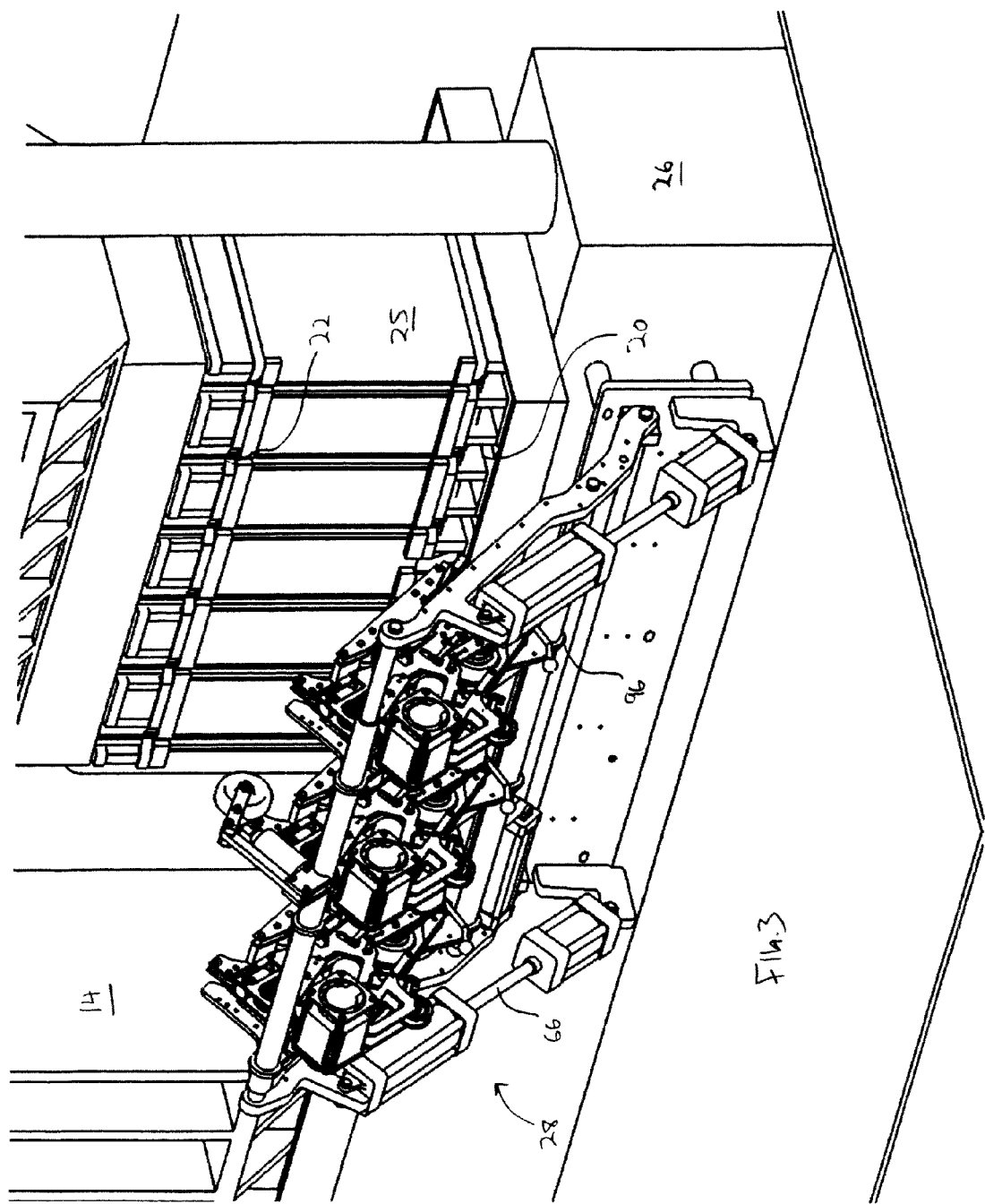
FIG. 3 is a perspective view of the load side of the bale strapping device of FIG. 1 with a strap positioning assembly in an intermediate position and a baling chamber exposing a strapped bale.

As described in more detail below, the bale strapping device 10 of the present invention allows strapping material to be fed around a bale through lower and upper guide channels 20, 22 (FIG. 3). and the return chutes 138, 140, 142 (FIG. 7).

With further reference to FIG. 1, the automatic bale strapping device 10 may be mounted to the baling press 12. For clarity of illustration, the baling press 12 is shown in simplified view. As described in more detail below, the automatic bale strapping device 10 is useful for attaching a plurality of straps around a bale 25 (FIG. 3) after the bale has been formed in the baling chamber 16. Although in one exemplary embodiment the automatic baling system 10 is adapted to simultaneously attach three straps around one bale, then indexing to a second position to apply three more straps, thus the bale would be strapped with six total straps, the baling system may be adapted to tie additional or fewer number of straps circumferentially around the outside surface of the bale, such as tying six straps simultaneously around the bale. Additionally, although the automatic bale strapping device 10 is described with particular reference to a cotton or fiber baling operation, the baling system may be adapted for baling other suitable materials as well. For example, crushed card board boxes and used clothing may be pressed and strapped in accordance with aspects of the present invention.

The automatic bale strapping device 10 may include two separate assemblies which operate together to automatically position and join a plurality of thermoplastic straps around a bale, namely a strap positioning assembly 28 (FIGS. 1-6) and a return chute assembly 30 (FIG. 7). The strap positioning assembly 28 and the return chute assembly 30 may be mounted on opposing sides of a press base 26 of the baling press 12 to automatically strap a pressed bale, as further discussed below. The strap positioning assembly 28 (FIGS. 1-6) may be mounted on a load side (FIG. 1) of the baling press 12 while the return chute assembly may be mounted on a receiving side (FIG. 7) of the baling press. The term "load side" connotes a side of the bale strapping device 10 that loads the straps for strapping a pressed bale while the term "receiving side" connotes a side of the bale strapping device 10 that receives the straps and returns the straps so that the two ends of each strap meet at the respective strap assembly for welding. Additional disclosures on bale strapping devices are disclosed in U.S. Pat. Nos. 4,484,518; 5,673,614; and 6,536,336, the contents of each of which are expressly incorporated herein by reference in their entirety.

Referring now to FIG. 10, the turntable base plate 18 of the baling press 12 is rotatable around a rotational column 31, which is substantially centrally disposed between the first and second baling chambers 14, 16. The baling press 12 may further include a lower plate assembly 32 located on the turntable base plate 18 and having a plurality of elongated slotted lower guide channels 20 defined by barriers 44. Similarly, the baling press 12 may include an upper plate assembly 34 attached to a press ram (not shown) having a plurality of elongated slotted upper guide channels 22 defined by upper barriers 44. The upper guide channels 20 are aligned with the lower guide channels 20 and are open-ended and extend between the load side and the receiving side of the baling press 12. When loaded into each of the three weld head assemblies or strap assemblies 98 of the automatic bale strapping device 10, the straps are directed from the strap positioning assembly 28 (FIG. 1) to the return chute assembly 30 and back towards the strap positioning assembly through the upper and lower guide channels 20, 22. The straps exit the channels through the corresponding slots 36 during the bale strapping operation so that the strapped bale may be removed from the baling press 12.

The lower and upper plate assemblies 32, 34 may include a plurality of plates 38 coupled to adjacently spaced barriers 44. The plates 38 are configured to be slightly wider than the guide channels 20, 22. Side rails 46 (FIG. 10) aligned along each longitudinal side of the plates 38 and protruding toward the bale serve to extenuate the slots 36 created between the plates and through which the straps will pass to contact the bale. Additionally, headboards 48 aligned along each lateral side of the plates 38 and protruding toward the bale serve to maintain the bale out of the strap feeding area while being loaded and pressed. An ejection lever 33 may be located on the lower plate assembly 32 for ejecting a strapped bale 25 from the baling chamber.

Referring again to FIG. 1, the strap positioning assembly 28 is attached to the press base 26 by a mounting assembly 50. The mounting assembly 50 includes a mounting base 52 having a plurality of legs 54 spacing the mounting base from the press base 28, if needed. When incorporated, the legs 54 act as spacers for the strap positioning assembly 28 so that it may be spaced apart from the turntable base plate 18 by a sufficient gap for welding and strapping purposes (FIG. 6).

The strap positioning assembly 28 will now be described in more detail. Since the strap positioning assembly 28 has a substantially identical rotating structure on either side of the plurality of weld head or strap assemblies 98, for clarity only one side of the strap positioning assembly will be described in detail.

Figure 4:
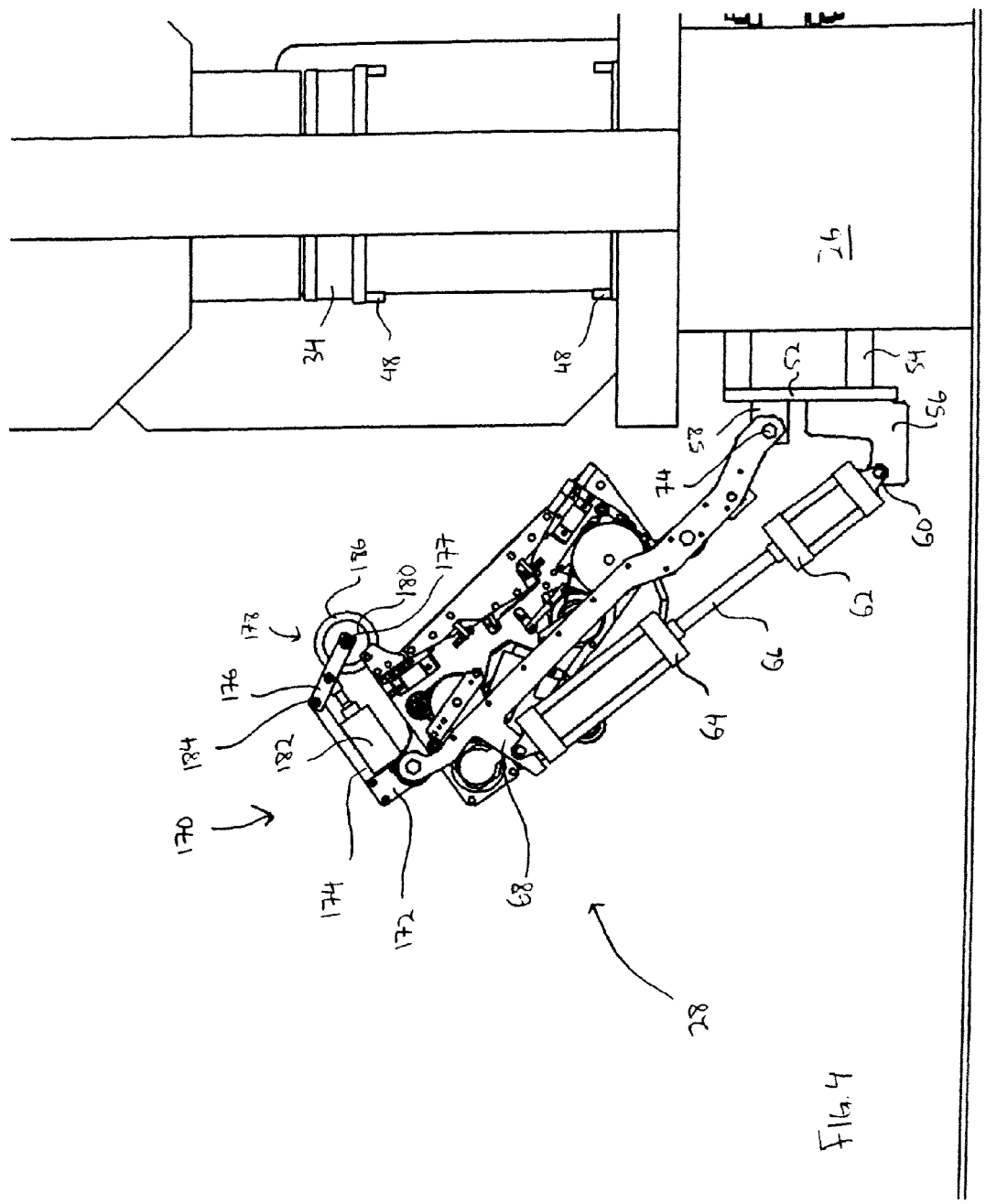
FIG. 4 is a side view of the load side of the bale strapping assembly of FIG. 3.

Referring to FIGS. 1 and 4, a primary bracket 56 is mounted on the mounting base 52 to support the strap positioning assembly 28, which in the present embodiment includes three weld head assemblies 98. However, four, six, eight, or any number of weld head assemblies and corresponding number of return chutes may be incorporated without deviating from the spirit and scope of the present invention. In one exemplary embodiment, the primary bracket 56 is substantially L-shaped, and may be located adjacent a lateral edge of the mounting base 52. However, the specific location of the primary bracket 56, and more generally, the location of the strap positioning assembly 28 is not critical as long as the strap positioning assembly is able to appropriately strap a bale in the baling chamber. The primary bracket 56 may be adapted to receive a first pivot pin 60 which allows the strap positioning assembly to be rotatably mounted thereto. A secondary bracket 58 may be aligned with and spaced apart from the primary bracket 56. The secondary bracket 58 is adapted to receive a second pivot pin 74. A support rod 61 may extend between secondary brackets 58 on each side of the strap positioning assembly 28 to provide torsional support when the strap positioning assembly moves between a stowed position and a used position, as described in more detail below.

A rotation structure 72 of the strap positioning assembly 28 includes a first pneumatic cylinder 62 rotatably attached to the primary bracket 56 by the first pivot pin 60. A push rod 66 in each of the first pneumatic cylinder 62 and second pneumatic cylinder 64 are coupled together at an interface. The two push rods 66, when the cylinders 62, 64 are actuated, are configured to maintain a spaced apart connection between the first and second pneumatic cylinders as the strap positioning assembly moves between a stowed position and a used position, as described in more detail below. In one exemplary embodiment, the cylinders each has a four inch aluminum bore with a one inch diameter steel rod. The cylinder 64 furthest away from the primary bracket 56 has a nine-and-a-half inch stroke (which may be the same for the cylinder 126 on the return chute assembly 30 (FIG. 7)) while the cylinder 62 closest to the primary bracket 56 has a four inch stroke (which may be the same for the cylinder 124 on the return chute assembly 30). However, the relative dimensions, models, and types may vary without deviating from the spirit and scope of the present invention provided they are appropriately sized to perform the necessary movements to permit the welding device 10 to feed, retract, and weld straps.

The second pneumatic cylinder 64 may be attached to a support arm 68 by a bolt 70 or other fastening means. The support arm 68 may extend between the second pneumatic cylinder 64 and the mounting base 52 and may be rotatably mounted to a secondary bracket 58 on the mounting base by the second pivot pin 74. In one exemplary embodiment as shown, for example, in FIG. 6, the support arm 68 may have a concave or shaped contour section 76 to prevent the support arm from contacting the turntable base plate 18 when the strap positioning assembly 28 is in the used position, as described in more detail below.

As noted above, the strap positioning assembly 28 has a substantially identical rotation structure 72 for rotating the strap positioning assembly from a stowed position to a strapping or used position located on either side of the plurality of weld head assemblies 98. Accordingly, upper and lower positioning rails 78, 80 extend laterally between support arms 68 on each side of the strap positioning assembly 28 as shown in FIG. 1. The support arms 68 include a recessed rail housing 82 adapted to receive the upper positioning rail 78, which is attached to the support arms by a bolt 84, or optionally by other fastening means. Additionally, the support arms 68 include holes adapted to receive a bolt to attach the lower positioning rail 80 to the support arms.

A strap assembly frame 88 may extend between the upper and lower positioning rails 78, 80 to support at least one strap assembly 98. In one exemplary embodiment as shown in FIG. 1, the strap positioning assembly 28 includes three strap assembly frames 88, one for each strap assembly 98. However, the number of strap assembly frames 88 is not critical, and the strap positioning assembly 28 may include as many strap assembly frames as necessary to support the number of strap assemblies 98. The frame 88 includes an upper cross beam 100 having an upper collar 94 which attaches the frame to an upper register tube 90. The upper register tube 90 is coaxial with and slidable along the upper positioning rail 78. The frame may further include a lower collar 96 (FIG. 2) which attaches the frame to a lower register tube 92 and which is coaxial with and slidable along the lower positioning rail 80. Strap assemblies 98 may be secured to each strap assembly frame 88 and each strap assembly is adapted to house and provide a strap of sufficient length to the return chute assembly 30 for strapping the bale. A lateral pneumatic cylinder 93 (FIG. 2) may be provided to register (i.e., laterally move) the strap assembly frame 88 between a first register position wherein each strap assembly 98 is aligned with first lower and upper guide channels 20, 22 and a second register position wherein each strap assembly is aligned with second, different lower and upper, guide channels.

Figure 5:
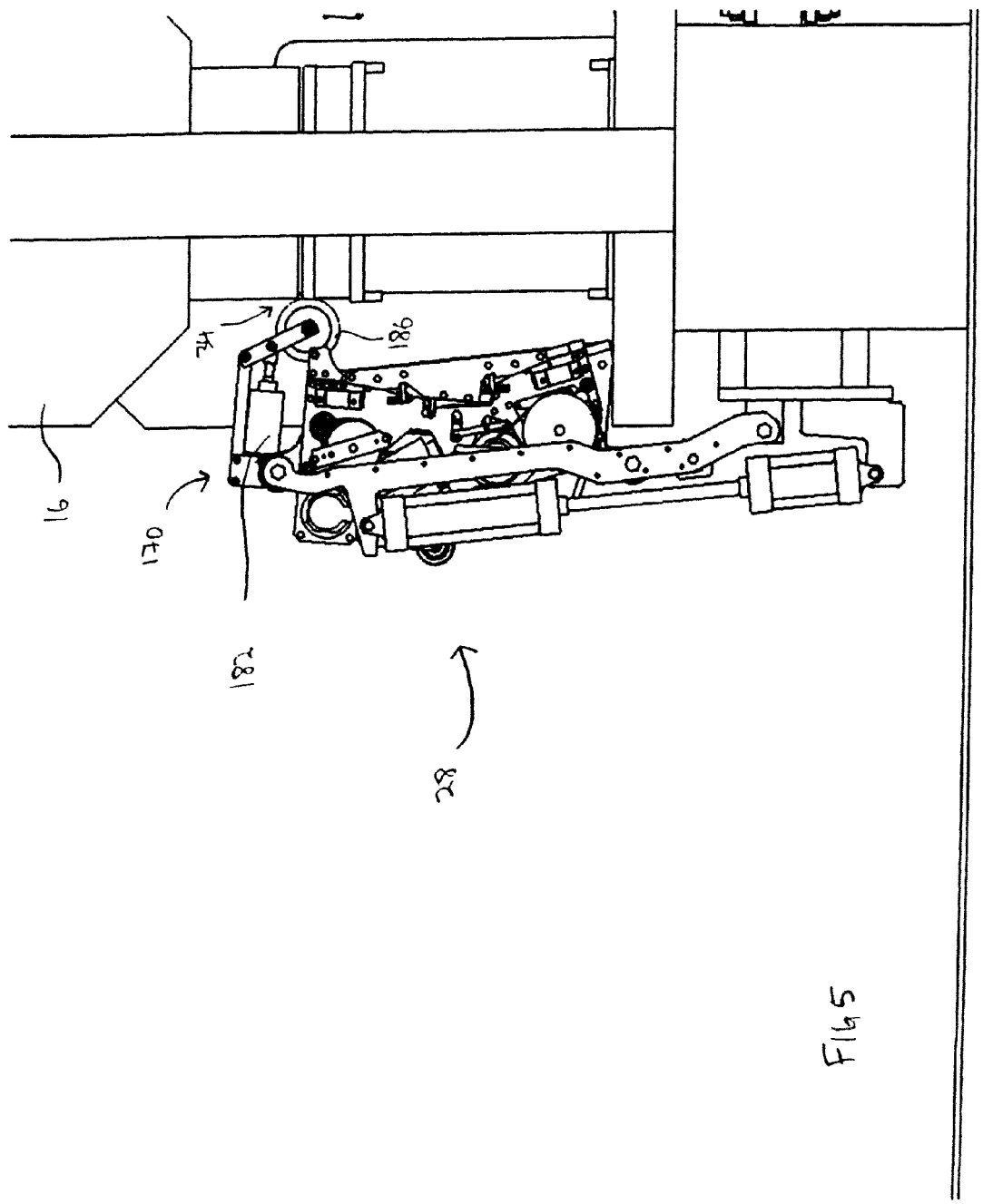
FIG. 5 is a side view of the load side of the bale strapping assembly of FIG. 1 with the strap positioning assembly in an intermediate position.
Figure 9:
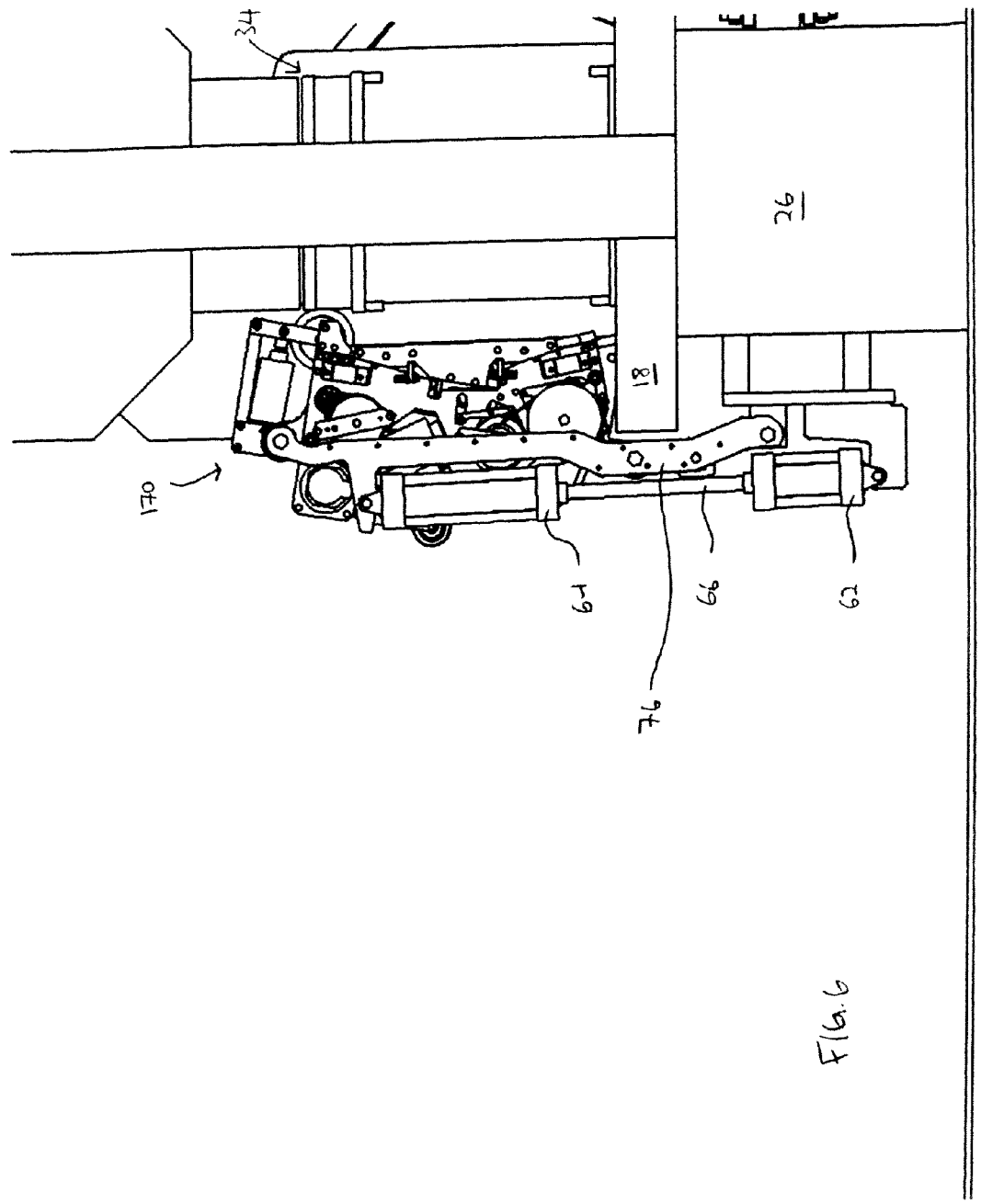
FIG. 9 is a perspective view of the receiving side of the bale strapping assembly of FIG. 7 wherein the return chute assembly is in a stowed position and moved away from a strapped bale in a baling chamber.

With reference to FIGS. 4-6, the strap positioning assembly 28 may further include a shock absorber 170 which serves to locate the strap positioning assembly with respect to the upper and lower plate assemblies 32, 34 and reduces the likelihood of the strap positioning assembly 28 being damaged by over rotation and impact with the plate assemblies. More specifically, the shock absorber 170 dictates the distance between the strap positioning assembly 28 and a bale when the strap positioning assembly moves into the used position, as described in more detail below.

The shock absorber 170 may include two substantially identical mounting brackets 172 (FIG. 2) adapted to mount the shock absorber to the upper register tube 90. Accordingly, the shock absorber 170 moves laterally in conjunction with the upper register tube 90, as further described below. A frame 174 may be attached to and protrude from between the mounting brackets 172 in a direction generally perpendicular to the support arms 68. A fork 176 may by rotatably attached to an end of the frame 174 opposite an end attached to the mounting brackets 172. The fork 176 may be attached to the frame 174 by a pivot pin 184 and adapted to house a wheel 178. The wheel 178, which includes a rim 180 and a tire 186, may be rotatably attached to the fork 176 by an axle 177. In one exemplary embodiment, the tire 186 may be made of a relatively soft material, such as rubber, which provides shock absorption when the tire contacts a relatively rigid surface, such as the upper plate assembly 34. A pneumatic cylinder 182 may be located below the frame 174 and attached to the mounting bracket 172 and the fork 176 to absorb some of the impact of the strap positioning assembly 28 with the upper plate assembly 34. In an alternative embodiment, rather than incorporating a shock absorber, a simple bumper, a leaf spring, a lever, a coiled spring, or other physical stop member is incorporated for locating the strap positioning assembly 28 against components of the baling press or the compressed cotton in moving the strap positioning assembly to its used position. Although not shown, the return chute assembly 30 may similarly be equipped with a shock absorber or the alternative position locator, such as a bumper, leaf spring, coiled spring, or other physical stop member. An exemplary simple bumper may be a resilient rubber block. This will allow the strap assembly and the return chute assembly to move to their respective used position prior to completing the compression process, which in turn decreases the lag time between exposing the compressed bale and strapping the bale.

Figure 8:
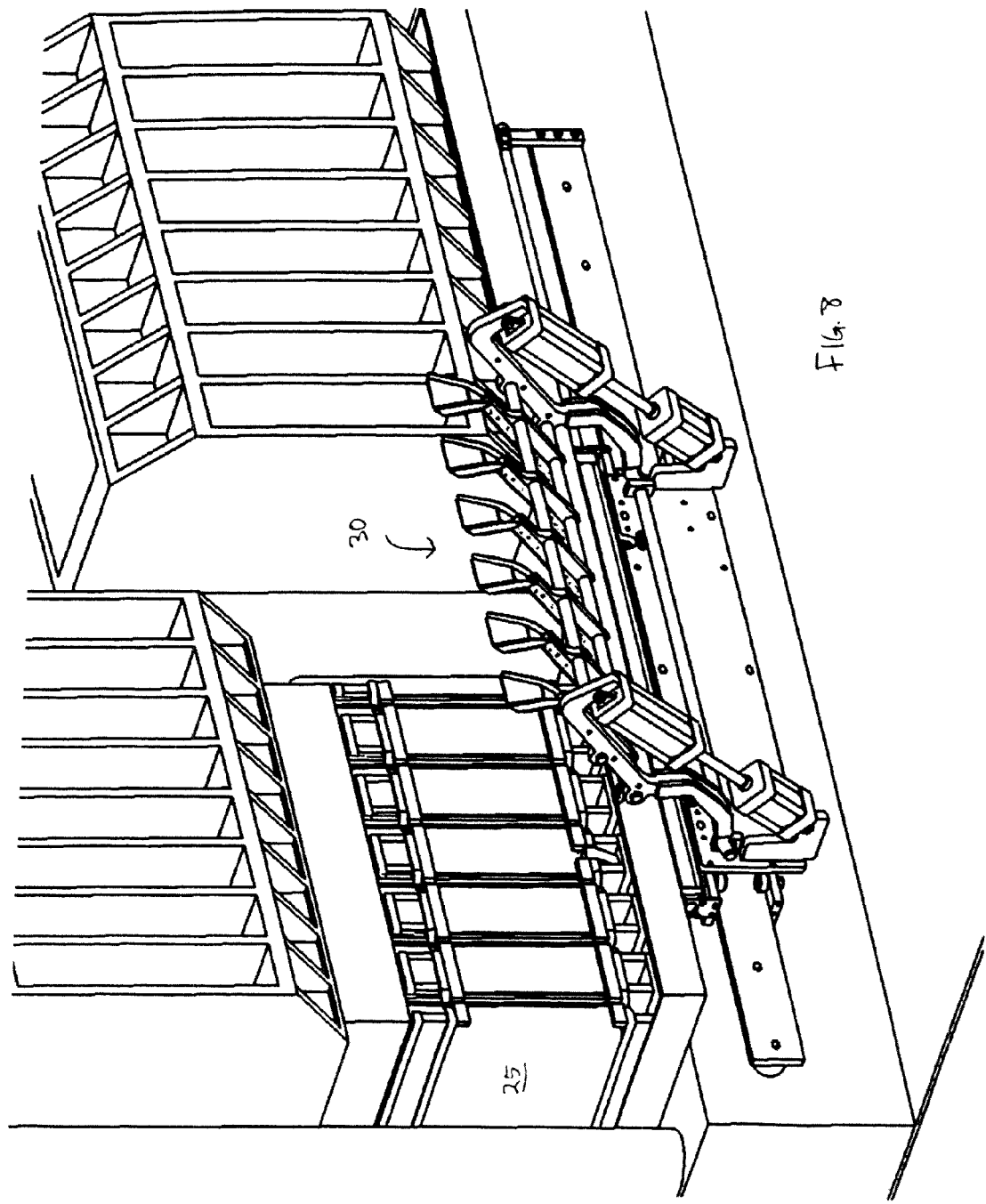
FIG. 8 is a perspective view of the receiving side of the bale strapping assembly of FIG. 7 wherein the return chute assembly is in an intermediate position.

The return chute assembly 30 will now be described with respect to FIGS. 7 and 8. The return chute assembly 30 may be adapted to work in conjunction with the strap positioning assembly 28 to strap bales, as will be described in greater detail below. A return chute mounting assembly 102 may be mounted to an opposite side of the baling press 12 from the strap positioning assembly 28 (the receiving side) and serves to support the return chute assembly. In one exemplary embodiment, the return chute mounting assembly 102 is adapted to permit the return chute assembly 30 to move laterally along the baling press 12 as described in more detail below. The return chute mounting assembly 102 includes a track 106 mounted on a plurality of legs 104, which act as spacers to provide appropriate gap or spacing for the track from the baling press 12. The height of the legs should be sufficient to provide enough clearance to prevent the return chute assembly 30 from interfering with the overhanging turntable base plate 18. The return chute assembly 30 will be indexed along the track 106 by a pneumatic cylinder 150 attached to the return chute assembly 30 at mount point 152. The cylinder 150 comprises a rod 146, which is mounted to a bracket 148. The cylinder 150 may incorporate a 36-96 inch stroke or may incorporate two or more separate cylinders with a combined stroke length sufficient to index the return chute assembly along the track 106. In the present embodiment, the indexing mechanism allows the return chute assembly 30 to traverse along the track 106 to work in combination with a motorized cart, i.e., to make room, for hauling strapped bales from the press machine.

A chassis 108 may be mounted to the track 106, the chassis being adapted to move along the track. In one exemplary embodiment, the chassis 108 has wheels 110 attached thereto, which are adapted to contact a front side and a rear side of the track 106 to allow the chassis to move along the track.

A base 112 may be attached to the chassis 108 to serve as support for the return chute assembly 30. In one exemplary embodiment, the base 112 is substantially rectangular and may have notches 154 to facilitate roller assembly and disassembly. Primary brackets 114 may be mounted to the base 114 and adapted to accommodate the return chute assembly 30 that is rotatably mounted thereto by a first pivot pin 120. In one exemplary embodiment, the primary brackets 114 may be substantially L-shaped in configuration and may be located on opposite lateral edges of the base 112. However, the specific number and location of the primary brackets 114 is not critical. Additionally, secondary brackets 116 may be aligned with and spaced apart from respective primary brackets 114 to receive a second pivot pin 122. A support rod 118 may extend between the secondary brackets 116 to provide torsional support when the return chute assembly 30 moves between a stowed position and a used position, as described in more detail below.

The return chute assembly 30 will now be described in more detail (FIGS. 7-10). Similar to the strap positioning assembly 28, since each side of the return chute assembly 30 has a substantially identical structure, for clarity only one of the sides of the return chute assembly will be described in detail below.

A rotation structure 128 of the return chute assembly 30 includes a first pneumatic cylinder 124 rotatably attached to the primary bracket 114 by the first pivot pin 120. A push rod 156 in each of the first pneumatic cylinder 124 and second pneumatic cylinder 126 are configured to move the two cylinders relative to one another to maintain a spaced apart connection between the two to thereby move the strap positioning assembly from between a stowed position to a used position, as described in more detail below. In one exemplary embodiment, the second pneumatic cylinder 126 may be attached to a support arm 130 by a bolt 158. The support arm 130 may extend between the second pneumatic cylinder 126 and the base 112 and may be rotatably mounted to the secondary bracket 116 on the base by a second pivot pin 122. In the exemplary embodiment of FIG. 7, the support arm 130 may have a concave section 144 which prevents the support arm from contacting the turntable base plate 18 when the return chute assembly 30 is in the used position as described in more detail below.

Upper and lower mounting rails 132, 134 may extend between the support arms 130 on each side of the return chute assembly. The support arms 130 may include recessed rail housings 160 adapted to receive the upper and lower mounting rails 132, 134, the mounting rails being attached to the support arms 130 by bolts 162.

The return chute 136 may be mounted on the return chute assembly 30 and adapted to redirect an end of a strap delivered by the strap positioning assembly 28 through the upper guide channel 34 towards the lower guide channel 32 where the ends of the strap will be attached together. In one exemplary embodiment, each return chute 136 may include a body 140, which includes a head 138 extending from a first end of the body and a tail 142 extending from a second end of the body, adapted to be mounted to the upper and lower mounting rails 132, 134. The return chute 136 may be an integrally formed component or may be separate components attached together by, for example, welding, rivets or other fastening means.

The body 140 may include a hollow channel section 164 and a fin section 166 attached to the channel section 164, which has an open channel for allowing release of the strap. The fin section comprises a plurality of spaced apart holes 168 to allow the fin section to be attached to the upper and lower mounting rails 132, 134. As will be described in more detail below, the body may be generally vertical when the return chute assembly 30 is in the used position. The head 138 may include a relatively wide opening 220 (FIG. 11) adapted to receive a strap from the strap positioning assembly 28 and may narrowingly taper towards the channel section 164 of the body 140. In one exemplary embodiment, the head 138 may be angled such that the opening 220 is relatively close to the upper guide channel 22 when the return chute assembly is in the used position and such that a strap end will be redirected to the tail 142. For example, the head may be angled between about 20 to 70 degrees, more preferably 30 to 60 degrees, from the vertical and the opening 220 may be between about 0.5 to 4 inches, more preferably one to two inches, from the upper guide channel 22 when the return chute assembly 30 is in a used position. The tail 142 may extend from the channel section 164 and in one exemplary embodiment, may generally arc toward a lower guide channel 20 when the return chute assembly 30 is in the used position such that the tail is able to direct a strap end into the lower guide channel 32. The tail 142 may be oriented such that the opening is relatively close to a lower guide channel 20 when the return chute assembly 30 is in the used position. In one exemplary embodiment, the tail may be between about 0.5 to 3 inches, more preferably one to two inches, from the lower guide channel 20 when the return chute assembly 30 is in the used position.

In one exemplary embodiment, the return chute assembly 30 includes six return chutes 136. However, the specific number of return chutes is not critical and may depend on the number of strap assemblies 98 incorporated in the strap positioning assembly 28. The return chutes 136 may be mounted on the upper and lower mounting rails 132, 134 such that the head 138 of the return chute is generally aligned with the upper guide channel 22 and the tail 142 is generally aligned with the lower guide channel 20 when the return chute assembly 30 is in the used position, as described in more detail below.

Figure 12:
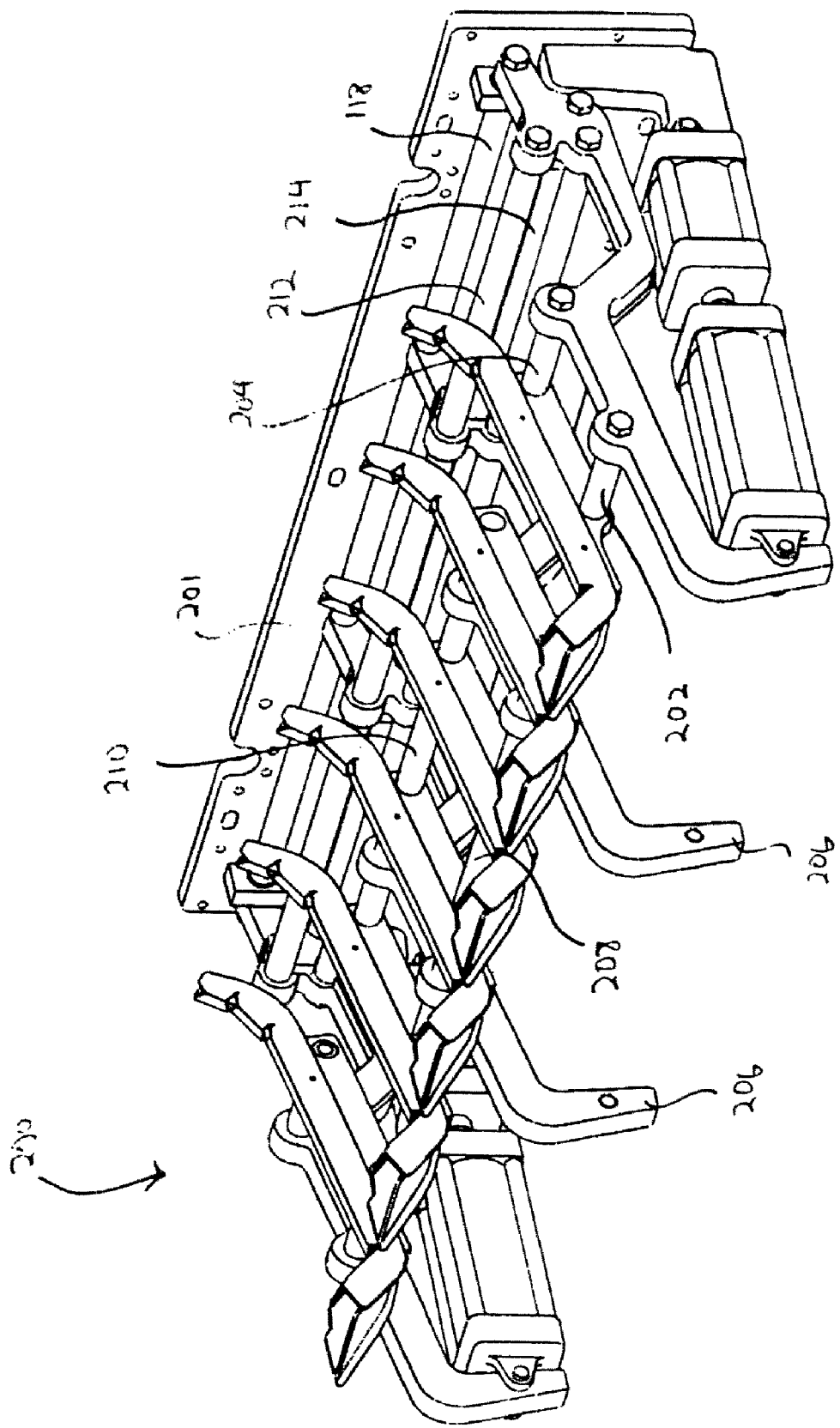
FIG. 12 is a perspective view of the return chute assembly of FIG. 11.

Another exemplary embodiment of a return chute assembly 200 is shown with reference to FIGS. 11, 12 and 13. The return chute assembly 200 is similar to the return chute assembly 30 of FIGS. 7-10 and, as such, only the differences between the two return chute assemblies will be highlighted. The return chute assembly 200 is adapted to operate in conjunction with a bale conveyor 188 as described in more detail below. As shown in FIG. 12, the return chute assembly 200 may be mounted on a mounting base that is statically attached to the baling press so that the track 106 and other accompanying components, which provide the ability for the return chute assembly 30 to move laterally, are not necessary.

As shown in FIG. 11, exterior return chutes 216 are mounted to support arms 130 by upper and lower exterior mounting rails 202, 204. Additionally, interior support arms 206 are provided to support the interior return chutes 218. More specifically, the interior support arms 206 are substantially identical to outer support arms 130. The interior support arms 206 are adapted to be mounted on the support rod 118 and on first and second support arm rails 212, 214, all of which extend laterally across the width of the return chute assembly 200 between the support arms 130. Upper and lower interior mounting rails 208, 210 are mounted on the interior support arms 206 and support interior return chutes 218 mounted thereto.

In this configuration, a space is created between each exterior return chute 216 and the respective adjacent interior return chute 218 such that no lateral support structure extends between the exterior and interior return chutes 216, 218. Accordingly, when the return chute assembly 200 is moved between a used position and a stowed position, as described in more detail below, the return chute assembly does not have to move laterally to avoid interfering with the bale conveyor 188. In one exemplary embodiment, the return chute assembly includes two exterior return chutes 216, four interior return chutes 218, and a space created between the exterior and interior return chutes. However, the specific number of return chutes is not critical and the return chute assembly 200 may contain as many return chutes as are necessary. Additionally, a space may be created between any of the return chutes to accommodate the bale conveyor 188.

The return chute assembly 200 may be used with the return chute mounting assembly 102 which allow for lateral movement of the return chute assembly, or in an alternate exemplary embodiment, the return chute assembly may be mounted to the baling press 12 by legs and a stationary mounting base similar to the mounting assembly 50 of the strap positioning assembly 28.

Referring now to FIG. 13, the bale conveyor 188 is provided to transport a bale 25 from the baling press 12 to a shipping means (not shown). The bale conveyor 188 is adapted to be positioned adjacent to the return chute assembly 200 so as not to interfere with operation of the return chute assembly 200 and so as not to require the return chute assembly to move laterally when a strapped bale 25 (FIG. 15) is transported from the baling press 12 to the bale conveyor 188.

In one exemplary embodiment, the bale conveyor 188 includes a frame 190 mounted on a plurality of legs 192. Two substantially identical rails 194 may be attached to the frame 190 and spaced apart from one another. Each rail is adapted to provide support for a belt 196 on which the bale 25 will be transported. Alternatively, a chain link or other looped structure may be used in stead of a belt. Gears 198 attached to the belts 196 move the belts when the gears are rotated by a motor, other gears, and/or a pulley system (not shown). Since the belts 196 form a continuous loop around the gears, the belts 196 will move as long as the gears 198 are rotated. The specific length of the rails is not critical, but the rails should be of a sufficient length to transport a bale from the bale strapping device 10 to a further transportation system. The conveyor system 188 is configured to replace a motorized platform or cart in a typical down-packer system for moving strapped bales. This improvement is made possible by the novel strapping system, which incorporates provisions for enabling the turntable base plate 28 to rotate in a two baling chamber system. In contrast to prior art systems, a motorized platform was required to traverse in and out to provide clearance for the moving turntable base plate. The motorized platform was not able to traverse into position until strapping was fully completed, adding to press cycle time.

Exemplary embodiments of the operation of the bale strapping device 10 will now be described. As noted above, the baling press 12 includes first and second baling chambers 14, 16. Cotton lint or other fibers are placed in the first baling chamber 14. Simultaneously, the compressible material in the second baling chamber 16 will be pressed into a bale and then strapped by the bale strapping device 10 and transported away from the baling press 12. Once the bale has been removed from the baling press 12, the turntable base plate 18 rotates such that the compressible material in the first baling chamber 14 is pressed and then strapped while cotton lint in the second baling chamber 16 is loaded.

The bale strapping device 10 may be positioned adjacent the baling chamber containing the bale (as opposed to the chamber containing the fiber or lint to be pressed). As discussed above, the bale strapping device 10 may include the strap positioning assembly 28 and the return chute assembly 30. Each of the strap positioning assembly 28 and the return chute assembly 30 has a used position, in which the assemblies operate to strap a bale, and a stowed position, in which the assemblies are positioned to permit operation of other components, such as rotation of the baling press 12 and transportation of a bale by the bale conveyor 188, or other means, such as a motorized cart, without interfering with the operation of such components.

With reference again to FIG. 1, the strap positioning assembly 28 is shown in the stowed position. In the stowed position, all of the components of the strap positioning assembly 28 are positioned or are rotated to be below a plane defined by the turntable base plate 18 so that when the turntable base plate rotates, the strap positioning assembly does not make contact or otherwise interfere with the turntable base plate. In other words, the strap positioning assembly 28, the return chute assembly 30, and components for supporting and operating the same are configured to retract from between a used position and a stowed position to enable rotation of the turntable base plate. More specifically, in one exemplary embodiment, when the strap positioning assembly is in the stowed position, the piston or push rods of the first and second pneumatic cylinders 62, 64 retract within their respective housings and are relatively close together and substantially parallel to the ground. Additionally, in the stowed position, the support arms 68 may be slightly angled toward the first and second pneumatic cylinders 62, 64. In this position, the strap assembly frame 88 and strap assemblies 98 may also be positioned below the plane of the turntable base plate 18.

The strap positioning assembly may be transferable between the stowed position and the used position (FIG. 6). In the used position, the strap position assembly 28 may be positioned to provide straps to the return chute assembly 30 to strap a bale in the baling press 12. As shown in FIG. 6, in one exemplary embodiment, when the strap positioning assembly is in the used position, the first and second pneumatic cylinders 62, 64 on both sides may be substantially perpendicular to the ground and are spaced apart by a greater distance than in the stowed position, separated by the push rod 66 of each respective pneumatic cylinder 62 and 64. Additionally, in the used position, the support arms 68 may be generally perpendicular to the ground.

To transfer the strap positioning assembly 28 between the stowed position and the used position, the first pneumatic cylinders 62 apply pressure to extend its push rod 66 and separate the second pneumatic cylinder 64 from the first pneumatic cylinder. Due to the position of the support arms 68 with respect the pneumatic cylinders 62, 64, the extension of the push rod 66 and the resulting separation of the pneumatic cylinders causes the support arms to rotate about the second pivot pin 74 and the first pneumatic cylinders 62 to rotate about the first pivot pin 60. This rotates the strap positioning assembly from a position substantially parallel to the ground (FIG. 1) to some position not quite vertical, which is determined by the length of the push rod. To move the strap positioning assembly 28 to a vertical position (FIG. 6), the other cylinder 64 is actuated so that its push rod 66 extends to further separate the distance between the two cylinders. Accordingly, the strap positioning assembly is rotated from being substantially parallel to the ground (FIG. 1) to being substantially perpendicular to the ground (FIG. 6) after the two cylinders are actuated.

Figure 2:
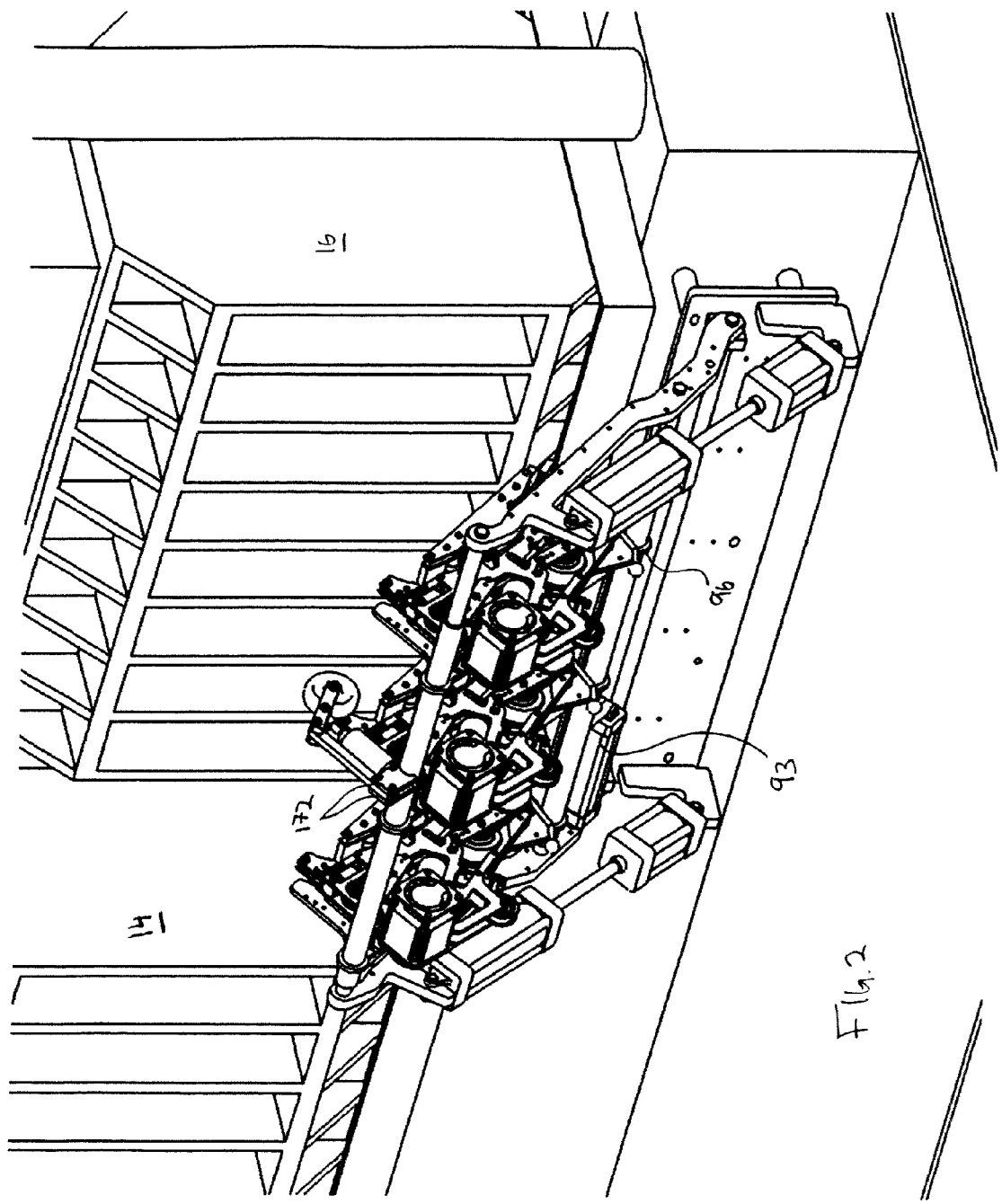
FIG. 2 is a perspective view of the load side of the bale strapping device of FIG. 1 with a strap positioning assembly in an intermediate position.

Thus, in one exemplary embodiment, each pair of pneumatic cylinders 62, 64 may be used to extend and maintain the strap positioning assembly 28 about halfway between the stowed position and the used position. For example, the first pair of pneumatic cylinders 62, 64 may extend and maintain the strap positioning assembly 28 between the stowed position to an intermediate position (FIG. 2). Then, the second pair of pneumatic cylinders 62, 64 may extend the strap positioning assembly 28 from the intermediate position to the used position. The use of an intermediate position allows the strap positioning assembly 28 and the return chute assembly 30 to move closer to their respective strapping position prior to exposing the pressed bale for strapping. This in turn reduces the lag time between exposing the pressed bale and strapping the pressed bale.

In one exemplary embodiment, to transfer the strap positioning assembly 28 from the used position to the stowed position the pneumatic cylinders 62, 64 may apply pressure to recess the push rods 66 within the pneumatic cylinders, thereby reducing the distance between the pneumatic cylinders. Accordingly, as the distance between the pneumatic cylinders 62, 64 is reduced, the support arms 68 will rotate about the second pivot pins 74 and the first pneumatic cylinders will rotate about the first pivot pins 60 to move the strap positioning assembly for being generally perpendicular to the ground to being generally parallel to the ground.

In another exemplary embodiment, each pair of pneumatic cylinders 62, 64 may be used to position and maintain the strap positioning assembly 28 about halfway between the used position and the stowed position. For example, the first pair of pneumatic cylinders 62, 64 may transfer and maintain the strap positioning assembly 28 between the used position to an intermediate position (FIG. 2). Then, the second pair of pneumatic cylinders 62, 64 may transfer the strap positioning assembly 28 from the intermediate position to the stowed position.

The return chute assembly 200 may be transferred between a used position (FIG. 7) and a stowed position (FIG. 14) in substantially the same way as the strap positioning assembly 28. More specifically, the first and second pneumatic cylinders 124, 126 apply pressure to the push rods 156 to adjust the distance between the cylinders and rotate the return chute assembly 200 around the first and second pivot pins 120, 122. In another exemplary embodiment, the return chute assembly 200 may be rotated to and maintained in an intermediate position (FIG. 8) between the used position and the stowed position.

An exemplary sequence of strapping a bale using a bale strapping device 10 of the present invention will now be described. The sequence will be described first with respect to the strap position assembly 28 and then with respect to the return chute assembly 30.

As shown in FIG. 1, the strap position assembly 28 may be in the stowed position and aligned with the second baling chamber 16 of the baling press 12. The second baling chamber 16 is shown in a closed position wherein the second baling chamber makes contact with the turntable base plate 18, or alternatively in close proximity thereto. While the second baling chamber 16 is in the closed position, the strap position assembly may be rotated into an intermediate position (FIG. 2) by operation of the pneumatic cylinders 62, 64 as noted above. The second baling chamber 16 may then move into an open position (FIG. 3) to expose the bale 25. As the second baling chamber 16 is moved from a closed position to an open position, the upper plate assembly 34 (FIG. 10) may be used to temporarily compress the bale 25. The bale is then further compressed after the chamber 16 is removed to a strapping height and then subsequently released to expand within the constraint of the straps.

Once the bale has been compressed, the strap positioning assembly 28 may be rotated into its used position (FIG. 6) as described above. As shown in FIGS. 5 and 6, the shock absorber 170 cushions the impact of the strap positioning assembly 28 as the shock absorber contacts the upper plate assembly 34. In the used position, the strap positioning assembly 28 aligns each strap assembly 98 with a lower and upper guide channel 20, 22 to enable the strap assembly to deliver a strap through the guide channels. In one exemplary embodiment, the strap positioning assembly 28 contains three strap assemblies 98, and for a baling press having six lower and upper guide channels 20, 22, the three strap assemblies may be aligned with alternating guide channels (i.e., the first, third, and fifth guide channels, or the second, fourth and sixth guide channels). In the used position, each strap assembly 98 delivers a strap and, in conjunction with the return chute assembly 30, friction welds the strap around the bale 25.

In an alternative embodiment, the strap positioning assembly 28 is rotated to its used position (FIG. 5) prior to fully compressing the bale and after the chamber 16 has been lifted. Thus, while the bale is still being pressed to a desired compression, the strap positioning assembly 28 is moved to its used position. This is made possible by the combination shock absorber system 170, which includes the wheel 178 and pneumatic cylinder 182. By moving the strap positioning assembly 28 to its used position prior to completing the pressed cycle, the lag time between compressing the bale and strapping the bale is further reduced. This in turn allows the baling system to process more bales per day.

After providing the first three straps, the strap positioning assembly 28 may again be rotated into an intermediate position and the lateral pneumatic cylinder 93 may be operated to register the strap positioning assembly 28 from a first register position aligned with a first set of lower and upper guide channels 20, 22 to a second register position aligned with a second set of lower and upper guide channels. The strap position assembly 28 may again be rotated into the used position to deliver and strap three more straps around the bale 25. As is readily apparent to a person of ordinary skill in the art, if the strap positioning assembly 28 incorporates six strap assemblies 98, then a single welding motion is all that is necessary to strap the compressed bale with six straps without having to reposition the strap positioning assembly 28 for a second strap sequence.

After the strap positioning assembly 28 has delivered the second set of straps, the pneumatic cylinder may be operated to return the strap positioning assembly to the first register position. Then, the strap positioning assembly may be rotated into the stowed position as the upper plate assembly 34 is lifted to allow the bale 25 to decompress such that the straps provide a compressive force to the bale. Once the bale has been strapped and allowed to decompress, the ejection lever 33 is operated to tip the bale from the baling chamber onto a transport, such as the bale conveyor 188 (FIG. 15). The transport serves to move the bale 25 away from the baling press 12 where the bale will then await further transportation to its next destination. With the strap positioning assembly 28 in the stowed position (FIG. 1), the second baling chamber may be lowered into the closed position and the turntable base plate 18 may be rotated to switch the positions of the first and second baling chambers 14, 16 such that the strap positioning assembly is now generally aligned with the first baling chamber 14. Accordingly, the above-described process may be repeated with respect to the bale in the first baling chamber 14, and may continue indefinitely as long as cotton lint is fed into the baling press 12. In some applications, it may not be necessary to move the strap positioning assembly and/or the return chute assembly from the used position to an intermediate position prior to indexing the same for the next set of straps. For example, it is possible to index to the next position while the two assemblies are in their respective used position.

A sequential strapping operation with respect to the return chute assembly 30 will now be described. With reference to FIG. 7, the return chute assembly 30 is located on an opposite side of the baling press 12 from the strap positioning assembly 28. The return chute assembly 30 may be rotated into the used position after the second baling chamber 16 is lifted to expose the bale 25. In the used position, each return chute 136 may be aligned with a lower and upper guide channel 20, 22 so as to be able to redirect a strap delivered by the corresponding strap assembly 98 through the upper guide channel 22 and into the lower guide channel 20. Accordingly, the return chute assembly 30 may remain in the used position until the strap positioning assembly 28 delivers straps through all six upper guide channels 22.

Once the strapping process has been completed, the return chute assembly may be rotated into an intermediate position (FIG. 8) and may be moved laterally along the track 106 until it is generally adjacent the first baling chamber 14 (FIG. 9), at which time or during lateral movement it may be rotated into the stowed position. After the return chute assembly 30 has been moved laterally away from the second baling chamber 16, a transport device, such as a cart (not shown), may be placed adjacent the bale 25. The ejection lever 33 may then be operated to tip the bale onto the transport device.

With the return chute assembly 30 in the stowed position, the second baling chamber 16 may be moved into the closed position and the turntable base plate 18 may be rotated to switch the positions of the first and second baling chambers 14, 16, as described above.

In another exemplary embodiment, the bale strapping device 10 includes the return chute assembly 200 which operates in a substantially similar manner to the return chute assembly 30 of FIGS. 7-10. However, after the bale 25 has been strapped and prepared for transport, the configuration of the return chute assembly 200 may be moved directly from the used position to the stowed position without having to be moved laterally. More specifically, as described above, the return chute assembly 200 has a spaced apart configuration which allows a transport device, such as a bale conveyor 188 (FIG. 14) to remain adjacent to the baling press 12 despite the presence of the return chute assembly. Time may be saved using the return chute assembly 200 since the return chute assembly and the transport device do not have to be moved to accommodate each other.

In an alternative embodiment, after the bale has been strapped, the return chute assembly 200 is then moved to its intermediate position. When the strapped bale is subsequently tipped, it tips against the return chute assembly 200, which then slowly lowers the strapped bale onto the conveyor system as the return chute assembly 200 moves to it stowed position. This effectively eliminates any impact the strapped bale may cause to the conveyor system if not for the return chute assembly 200 controlling the landing of the strapped bale Although exemplary embodiments of a bale strapping device and method for strapping a bale have been described, it will be appreciated by one of ordinary skill in the art that modifications may be made to such devices and methods while still remaining within the scope of the appended claims. For example, although an exemplary embodiment bale strapping device of the present invention includes three strap assemblies mounted on the strap positioning assembly and six return chutes mounted on the return chute assembly, the bale strapping device may be modified to include a variety of strap assemblies and return chutes to provide the appropriate number of necessary straps. Further modifications include incorporating a shock absorber or position locator, such as a bumper, on both the strap positioning assembly 28 and the return chute assembly 30 so that the both assemblies may move into contact, i.e., used position, with either components of the bale system or the compressed lint while the lint still undergoes final compression just prior to the strapping sequence. As previously discussed, this further reduces lag time from between exposing the compressed bale and actually strapping the bale.

What is claimed is:

1. A method for strapping compressible materials comprising:
    compressing a plurality of compressible materials against a plate, said plate defining a plane;
    exposing the compressed materials for strapping;
    rotating at least three strap assemblies mounted on a frame from a position below the plane defined by the plate while the compressible materials are still undergoing a pressed cycle, said frame comprising a shock absorber;
    providing a plurality of straps around the compressed materials to strap the compressed materials;
    lowering the plurality of strap assemblies to the position below the plane defined by the plate; and
    wherein the rotating step comprises two actuator cylinders operated serially to move the frame from the position below the plane to an operating position.

2. The method of claim 1, wherein the at least three strap assemblies are raised and lowered by a rotational structure comprising at least one moveable arm and the frame.

3. The method of claim 2, wherein the shock absorber is mechanically coupled to the frame and projects outwardly further towards the compressible materials when the frame is in a strapping position than any other structure on the frame.

4. The method of claim 1, further comprising:
    locating at least three return chutes above the plane defined by the plate to redirect straps supplied by the at least three strap assemblies;
    lowering the at least three return chutes below the plane defined by the plate after the compressed materials have been strapped.

5. The method of claim 4, further comprising an ejection lever for ejecting a strapped bale towards a bale conveyor.

6. The method of claim 1, further comprising a bale conveyor comprising two spaced apart rails.

7. The method of claim 6, wherein the bale conveyor comprises a rotatable gears.

8. The method of claim 1, further comprising:
    moving the at least three strap assemblies laterally by a fixed distance;
    re-raising the at least three strap assemblies from a position below the plane defined by the plate;
    providing another plurality of straps around the compressible materials to strap the compressible materials; and
    re-lowering the at least three strap assemblies to the position below the plane defined by the plate.

9. The method of claim 8, wherein the at least three strap assemblies are moved laterally by a pneumatic cylinder comprising a push rod.

10. A combination strap assembly and baling press comprising:
    a base plate for pressing pressible materials against, said base plate defining a plane,
    a baling chamber defining a cavity for pressing a bale;
    a strap positioning assembly comprising a plurality of strap assemblies, said strap positioning assembly comprising an upper end positioned away from the base plate and a lower end positioned closer to the base plate than the upper end;
    a return chute assembly comprising a plurality of return chutes for redirecting straps supplied by the plurality of strap assemblies;
    a structure comprising a moveable arm for moving the plurality of strap assemblies from a position substantially below the plane defined by the base plate to a position above, at least in part, the plane; and
    a shock absorber mounted on the strap positioning assembly between the upper end and the lower end for dampening vibration of the strap positioning assembly, said shock absorber extending further outwardly on the strap positioning assembly towards the baling chamber than any other structure on the strap positioning assembly when in an operating position.

11. The combination strap assembly and baling press of claim 10, wherein the shock absorber is configured to contact an upper plate assembly.

12. The combination strap assembly and baling press of claim 10, wherein the shock absorber is configured to contact the pressible materials.

13. The combination strap assembly and baling press of claim 10, wherein the shock absorber is positioned between two end strap assemblies of the strap positioning assembly.

14. The combination strap assembly and baling press of claim 10, further comprising a pair of pneumatic cylinders each comprising a push rod opposing one another for moving the moveable arm.

15. The combination strap assembly and baling press of claim 14, wherein the two push rods of the pair of pneumatic cylinders are mechanically coupled to one another.

16. The combination strap assembly and baling press of claim 14, further comprising an indexing pneumatic cylinder comprising a push rod, wherein the push rod of the indexing pneumatic cylinder is orientated to move in a direction generally orthogonal to the two push rods of the pair of pneumatic cylinders.

17. A strap assembly mountable on a baling press having a base plate defining a plane, the strap assembly comprising:
    a strap positioning assembly comprising a frame having a plurality of strap assemblies mounted thereon for providing straps around pressible materials;

a return chute assembly having a plurality of return chutes for redirecting straps supplied by the plurality of strap assemblies;

a first pneumatic cylinder and a second pneumatic cylinder, the first and second pneumatic cylinders each comprising a push rod in sliding communication with each other for moving the plurality of strap assemblies a first rotation about a pivot point when the first pneumatic cylinder is actuated and a second rotation about the pivot point when the second pneumatic cylinder is actuated;

a shock absorber for maintaining a pre-determined gap between the frame and the pressible materials; and wherein the shock absorber is configured to contact at least one of the baling press and the pressible materials to maintain the pre-determined gap between the frame and the pressible materials.

18. The strap assembly of claim 17, wherein the shock absorber is mounted on the frame and movable when the first pneumatic cylinder or the second pneumatic cylinder is actuated.

19. The strap assembly of claim 17, wherein the shock absorber comprises a wheel.

20. The strap assembly of claim 17, wherein the shock absorber contacts the bailing press or the pressible materials before a full pressed cycle.

21. The strap assembly of claim 17, wherein the shock absorber is at least one of a simple bumper, a leaf spring, a lever, a coiled spring, and a stop member.

22. The strap assembly of claim 17, wherein the shock absorber is located on the strap positioning assembly and movable with the strap positioning assembly.

23. The combination strap assembly and baling press of claim 10, wherein the shock absorber is a strap assembly locator.

24. The combination strap assembly and baling press of claim 10, wherein the shock absorber is at least one of a simple bumper, a leaf spring, a lever, a coiled spring, and a stop member.

* * * * *

UNITED STATES PATENT AND TRADEMARK OFFICE
CERTIFICATE OF CORRECTION

| | | |
|---|---|---|
| PATENT NO. | : 7,841,272 B2 | Page 1 of 1 |
| APPLICATION NO. | : 12/435275 | |
| DATED | : November 30, 2010 | |
| INVENTOR(S) | : Bradley Paul Actis et al. | |

It is certified that error appears in the above-identified patent and that said Letters Patent is hereby corrected as shown below:

In column 4, line 20, delete "3)." and insert -- 3) --, therefor.

In column 10, line 50, delete "in stead" and insert -- instead --, therefor.

In column 12, line 30, delete "position" and insert -- position, --, therefor.

In column 15, line 5, after "bale" insert -- . --.

In column 16, line 16, in Claim 10, delete "pressible" and insert -- pressable --, therefor.

In column 16, line 45, in Claim 12, delete "pressible" and insert -- pressable --, therefor.

In column 16, line 67, in Claim 17, delete "pressible" and insert -- pressable --, therefor.

Signed and Sealed this
Twenty-second Day of March, 2011

David J. Kappos
*Director of the United States Patent and Trademark Office*